United States Patent
Arrington et al.

(10) Patent No.: US 6,897,183 B2
(45) Date of Patent: May 24, 2005

(54) PROCESS FOR MAKING IMAGE RECORDING ELEMENT COMPRISING AN ANTISTAT TIE LAYER UNDER THE IMAGE-RECEIVING LAYER

(75) Inventors: Eric E. Arrington, Canandaigua, NY (US); Thomas M. Laney, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 106 days.

(21) Appl. No.: 10/375,744

(22) Filed: Feb. 26, 2003

(65) Prior Publication Data

US 2004/0164444 A1 Aug. 26, 2004

(51) Int. Cl.$^7$ .......................... B41M 5/035; B41M 5/38
(52) U.S. Cl. ................. 503/227; 427/152; 264/173.16; 264/177.19; 264/211.2
(58) Field of Search .................. 264/173.16, 177.19, 264/211.2; 427/152; 503/227; 428/195.1, 32.39, 32.51; 364/173.16, 177.19

(56) References Cited

U.S. PATENT DOCUMENTS

| | | | |
|---|---|---|---|
| 4,908,345 A | 3/1990 | Egashira et al. | ............. 503/227 |
| 5,112,799 A | 5/1992 | Egashira et al. | ............. 503/227 |
| 5,302,574 A | 4/1994 | Lawrence et al. | |
| 5,387,571 A | 2/1995 | Daly | ........................ 503/227 |
| 5,851,720 A * | 12/1998 | Shinohara | .................. 430/201 |

* cited by examiner

Primary Examiner—Bruce Hess
(74) Attorney, Agent, or Firm—Kathleen Neuner Manne

(57) ABSTRACT

This invention relates to a process for making an image-recording element, for example a dye-receiving element for thermal dye transfer, that includes a support having on one side thereof a image-receiving layer and, between the image-receiving layer and the support, a tie layer comprising a thermoplastic antistat polymer. In one embodiment, the process comprises (a) forming a first melt of a polymer for the surface layer and a second melt comprising a thermoplastic antistat polymer in a polymeric binder; (b) coextruding the two melts onto a polyolefin support; (c) stretching the coextruded layers to reduce the thickness; and (d) applying the coextruded melts to a support while simultaneously reducing the temperature below the Tg of the composition of the surface layer.

42 Claims, No Drawings

PROCESS FOR MAKING IMAGE RECORDING ELEMENT COMPRISING AN ANTISTAT TIE LAYER UNDER THE IMAGE-RECEIVING LAYER

FIELD OF THE INVENTION

This invention relates to image recording elements, including dye-receiving elements used in thermal dye transfer, and more particularly to polymeric image-receiving layers for such elements.

BACKGROUND OF THE INVENTION

In recent years, thermal transfer systems have been developed to obtain prints from pictures which have been generated from a camera or scanning device. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The two are then inserted between a thermal printing head and a platen roller. A line-type thermal printing head is used to apply heat from the back of the dye-donor sheet. The thermal printing head has many heating elements and is heated up sequentially in response to one of the cyan, magenta or yellow signals. The process is then repeated for the other two colors. A color hard copy is thus obtained which corresponds to the original picture viewed on a screen.

Dye receiving elements used in thermal dye transfer generally include a support (transparent or reflective) bearing on one side thereof a dye image-receiving layer, and optionally additional layers. The dye image-receiving layer conventionally comprises a polymeric material chosen from a wide assortment of compositions for its compatibility and receptivity for the dyes to be transferred from the dye donor element. Dye must migrate rapidly in the layer during the dye transfer step and become immobile and stable in the viewing environment. Care must be taken to provide a receiving layer which does not stick to the hot donor as the dye moves from the surface of the receiving layer and into the bulk of the receiver. An overcoat layer can be used to improve the performance of the receiver by specifically addressing these latter problems. An additional step, referred to as fusing, may be used to drive the dye deeper into the receiver.

In sum, the receiving layer must act as a medium for dye diffusion at elevated temperatures, yet the transferred image dye must not be allowed to migrate from the final print. Retransfer is potentially observed when another surface comes into contact with a final print. Such surfaces may include paper, plastics, binders, backside of (stacked) prints, and some album materials.

Polycarbonates (the term "polycarbonate" as used herein means a polyester of carbonic acid and a diol or diphenol) and polyesters have both been used in image-receiving layers. For example, polycarbonates have been found to be desirable image-receiving layer polymers because of their effective dye compatibility and receptivity. As set forth in U.S. Pat. No. 4,695,286, bisphenol-A polycarbonates of number average molecular weights of at least about 25,000 have been found to be especially desirable in that they also minimize surface deformation which may occur during thermal printing. These polycarbonates, however, do not always achieve dye transfer densities as high as may be desired, and their stability to light fading may be inadequate. U.S. Pat. No. 4,927,803 discloses that modified bisphenol-A polycarbonates obtained by co-polymerizing bisphenol-A units with linear aliphatic diols may provide increased stability to light fading compared to ummodified polycarbonates. Such modified polycarbonates, however, are relatively expensive to manufacture compared to the readily available bisphenol-A polycarbonates, and they are generally made in solution from hazardous materials (e.g. phosgene and chloroformates) and isolated by precipitation into another solvent. The recovery and disposal of solvents coupled with the dangers of handling phosgene make the preparation of specialty polycarbonates a high cost operation.

Polyesters, on the other hand, can be readily synthesized and processed by melt condensation using no solvents and relatively innocuous chemical starting materials. Polyesters formed from aromatic diesters (such as disclosed in U.S. Pat. No. 4,897,377) generally have good dye up-take properties when used for thermal dye transfer; however, they exhibit severe fade when the dye images are subjected to high intensity daylight illumination. Polyesters formed from alicyclic diesters are disclosed in U.S. Pat. No. 5,387,571 of Daly, the disclosure of which is incorporated by reference. These alicyclic polyesters also generally have good dye up-take properties, but their manufacture requires the use of specialty monomers which add to the cost of the receiver element. Polyesters formed from aliphatic diesters generally have relatively low glass transition temperatures, which frequently results in receiver-to-donor sticking at temperatures commonly used for thermal dye transfer. When the donor and receiver are pulled apart after imaging, one or the other fails and tears and the resulting images are unacceptable.

U.S. Pat. No. 5,302,574 to Lawrence et al. discloses a dye-receiving element for thermal dye transfer comprising a support having on one side thereof a dye image-receiving layer, wherein the dye image-receiving layer comprises a miscible blend of an unmodified bisphenol-A polycarbonate having a number molecular weight of at least about 25,000 and a polyester comprising recurring dibasic acid derived units and diol derived units, at least 50 mole % of the dibasic acid derived units comprising dicarboxylic acid derived units containing an alicyclic ring within two carbon atoms of each carboxyl group of the corresponding dicarboxylic acid, and at least 30 mole % of the diol derived units containing an aromatic ring not immediately adjacent to each hydroxyl group of the corresponding diol or an alicyclic ring. Thus, the alicyclic polyesters were found to be compatible with high molecular weight polycarbonates.

U.S. Pat. No. 4,908,345 to Egashira et al. discloses a dye receiving layer comprising a phenyl group (e.g. bisphenolA) modified polyester resin synthesized by the use of a polyol having a phenyl group as the polyol compound. U.S. Pat. No. 5,112,799, also to Egashira et al., discloses a dye-receiving layer formed primarily of a polyester resin having a branched structure.

Polymers may be blended for use in the dye-receiving layer in order to obtain the advantages of the individual polymers and optimize the combined effects. For example, relatively inexpensive unmodified bisphenol-A polycarbonates of the type described in U.S. Pat. No. 4,695,286 may be blended with the modified polycarbonates of the type described in U.S. Pat. No. 4,927,803 in order to obtain a receiving layer of intermediate cost having both improved resistance to surface deformation which may occur during thermal printing and to light fading which may occur after printing.

It would be highly desirable to provide an image recording element with an image-receiving layer comprising a polymer composition capable of providing excellent image properties. It would also be desirable for the image-receiving layer to be readily applied to the underlying support without inadequate adhesion problems. It would be further desirable to provide such an image recording element in which the dye-image layer is extrudable. It would be still further desirable if a tie layer for adhering the image-receiving layer to the support for the recording element could provide not only improved adhesion but additionally provide antistat properties to the recording element.

SUMMARY OF THE INVENTION

This invention relates to a process for making an image-recording element, for example, a dye-receiving element for thermal dye transfer, that includes a support having on one side thereof an image-receiving layer wherein between the image-receiving layer and the support is a tie layer comprising an optional polyolefin-containing binder and a thermoplastic antistat polymer. In particular, the invention relates to a method of forming a multilayer film for use in an image recording element, which multilayer (i.e., composite) film comprises at least two layers, a surface layer and a tie layer directly adjacent the surface layer. The process comprises (a) forming a first melt of a polymer for a surface layer and a second melt comprising a thermoplastic antistat polymer in an optional polymeric binder; (b) coextruding at least the two melts onto a polyolefin support; (c) stretching the coextruded layers to reduce the thickness; (d) applying the coextruded melts to a support while simultaneously reducing the to below the Tg of the composition of the surface layer. The melt for the tie-layer composition, comprising both antistat polymer and optional binder, preferably exhibits a viscosity that is not more than 10 times or less than 1/10 that of the melt for the surface layer when extruded with at least the first layer; and the peel strength, in Newtons/meter, of said surface layer in contact with the tie layer is at least twice the peel strength in the absence of the tie layer.

The present invention is applicable to the manufacture of an image recording element, including those used in thermal dye transfer processes, electrophotography, or other printing techniques, wherein an image is printed on a thermoplastic image-receiving layer, whether dye, pigment, or toner is employed as the colorant or ink. In one embodiment, a dye-receiver element in accordance with the present invention exhibits excellent lightfade and high dye transfer efficiency, as well as low materials cost.

DETAILED DESCRIPTION

The present invention relates to a process for making a multilayer film, useful in an image recording element, which multilayer film comprises a support and an outer or surface layer wherein between the support and the outer layer is an "antistat tie layer" comprising a thermoplastic antistat polymer or composition having preselected antistat properties, adhesive properties, and viscoelastic properties. In one embodiment of the invention, such a multilayer film is used in making a thermal-dye-transfer dye-receiver element comprising a support and an dye-receiving layer wherein between the support and the dye-receiving layer is a tie layer.

In particular, one aspect of the innovation relates to a process of forming a multilayer film comprising at least two layers, a surface layer and a tie layer directly adjacent the surface layer, wherein the process comprises (a) forming a first melt, for the surface layer, comprising a first polymeric binder, (b) forming a second melt, for the tie layer, comprising a thermoplastic antistat polymer in an optional second polymeric binder, wherein the second melt exhibits a viscosity that is not more than 10 times or less than 1/10 that of the first melt during the following extrusion step; (c) coextruding the two melts to form a composite film; (d) stretching the composite film to reduce its thickness; and (e) applying the stretched composite film to a support while simultaneously reducing the temperature of the composite film below the Tg of the surface layer.

Preferably, the composition of the tie layer comprises a polyolefin-containing binder and a thermoplastic antistat polymer. Preferably, also, the peel strength, in Newtons/meter, of said surface layer and support in contact with the tie layer is at least twice the peel strength in the absence of the tie layer. The antistat polymer exhibits a volume resistivity of $10^5$ to $10^{11}$ Ohms per square, preferably $10^6$ to $10^{12}$ Ohms per square. Preferably the viscosity of the dye-receiving layer melt composition is 100 to 10,000 poise at 1 $\sec^{-1}$ shear rate at a temperature between 100 and 300° C.

Peel strength is a measurement or method to assess the interlayer adhesion. Peel strength can be assessed as follows. An image receiving layer of a multilayer receiver sample is glued to a firm surface. A tape is applied to the other exposed surface and then peeled away. Peeling is accomplished by gripping the tape, bending it through a 90 angle until it can be pulled away (peeled) in a direction parallel to the film surface. All tests are performed in a standard environment of 50% RH and 23C. The films are peeled using an IMASS SP-2000 Slip/Peel Tester or the equivalent. The crosshead speed was 5.1 mm/sec. The sample size is 2.54 cm×15.2 cm. Four specimens are tested per support sample. For a tie layer, the range of adhesion in Newtons/meter is preferably 3–114 Newtons/meter.

In the preferred embodiment, the antistat polymer is a block polymer which has a structure such that blocks of a polyolefin and blocks of a hydrophilic polymer are bonded together alternately and repeatedly. Preferably, the blocks of the hydrophilic polymer are polyether blocks. The polyether blocks can be formed from one or more alkylene oxides having 2 to 4 carbon atoms. The polyether blocks can comprise ethylene oxide, propylene oxide, or butylene oxide, or combinations thereof, preferably comprising at least 50 mole % ethylene oxide in the polyoxyalkylene chains. Typically, the polyolefins are obtained by polymerization of one or a mixture of two or more olefins containing 2 to 30 carbon atoms, preferably containing 2 to 12 carbon atoms, particularly preferably propylene and/or ethylene. Alternatively, low molecular weight polyolefins can be obtained by thermal degradation of high molecular weight olefins. The number average molecular weight of the polyolefin is preferably 800 to 20,000.

In one embodiment, the antistat polymer is a block polymer having a structure such that the polyolefin block and the polyether block are bonded together alternately and repeatedly such that the polymers have a repeating unit represented by the following general formula (1).

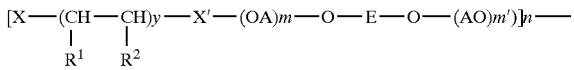

(I)

In the general formula (I), n is an integer of 2 to 50, one of $R^1$ and $R^2$ is a hydrogen atom and the other is a hydrogen atom or an alkyl group containing 1 to 10 carbon atoms, y is an integer of 15 to 800, E is the residue of a diol after removal of the hydroxyl groups, A is an alkylene group containing 2 to 4 carbon atoms, m and m' each represents an integer of 1 to 300, X and X' are connecting groups used in the synthesis of the block polymer as listed in EP 1167425 A1, hereby incorporated by reference in its entirety.

Such a block copolymer can be formed by the reaction of a mixture comprising a modified polyether and a modified polyolefin. For example, one or more polyether reactants such as polyether diols can be reacted with polyolefin reactants (obtained by modifying the termini of the polyolefin with carbonyl-containing groups or the like) and a polycondensation polymerization reaction carried out generally at 200 to 250° C. under reduced pressure employing known catalysts such as zirconium acetate.

Preferably, the antistat polymer comprises a block copolymer of polyethylene oxide polyether segments with a polypropylene and/or polyethylene polyolefin segments. In one embodiment, the block polymer has a number average molecular weight of 2,000 to 200,000 as determined by gel permeation chromatography. The polyolefin of the block polymer may have carbonyl groups at both polymer termini and/or a carbonyl group at one polymer terminus.

A preferred material for the antistat tie layer is PELLESTAT 300 polymer, commercially available from Sanyo Chemical Industries, Ltd. (Tokyo) or Tomen America, Inc. (New York, N.Y.). The antistat polymer PELLESTAT 300 (a copolymer of a polyether and a polyolefin) is described in EP 1167425 A1. The antistat polymers comprising a polyolefin with polyether segments are preferred, for example a (propylene or polyethylene oxide (polyether) copolymer with polypropylene or polyethylene(polyolefin) and polypropylene 70:30. Such an antistat polymer is a block polymer which has a structure such that blocks of a polyolefin and blocks of a hydrophilic polymer having a volume resistivity of $10^5$ to $10^{11}$ Ohms per square are bonded together alternately and repeatedly. Typically, the block polymer has a number average molecular weight of 2,000 to 60,000 as determined by gel permeation chromatography.

The preferred antistat polymers such as PELLESTAT 300 do not require a compatibilizer and, therefore, compatibilizers can be substantially absent from the tie layer. Other antistat polymers may require a compatibilizer to obtain the necessary miscibility with polyolefins, as will be understood by the skilled artisan. Compatibilizers are typically low molecular weight polymers with functional groups that are compatible with both the antistat polymer and the binder polymer which are otherwise immiscible or non-compatible. The compatibilizer allows the antistat polymer and the binder to be uniformly dispersed. Examples of such antistat polymers are polyether-block copolyamide, a polyetheresteramide, and segmented polyether urethanes.

Other materials that can be used to make an antistat tie layer include PEBAX (commercially available from Atofina (Finland), which material is copolymer of polyether and polyamide. Such copolymers may be admixed with an alternative polymer, such as polyolefin, if a suitable compatibilizer is utilized, for example, to provide the desired viscoelastic properties.

Still other materials known in the art that can be melt processed while retaining their antistatic activity and overall physical performance are various polymeric substances containing a high concentration of polyether blocks. Ionic conduction along the polyether chains makes these polymers inherently dissipative, yielding surface resistivities in the range $10^8$ to $10^{13}$ Ohms per square. Examples of such ionic conductors are: Polyether-block-copolyamide (e.g., as disclosed in U.S. Pat. Nos. 4,115,475; 4,195,015; 4,331,786; 4,839,441; 4,864,014; 4,230,838; 4,332,920; and 5,840, 807), Polyetheresteramide (e.g., as disclosed in U.S. Pat. Nos. 5,604,284; 5,652,326; 5,886,098), and a thermoplastic polyurethane containing a polyalkylene glycol moiety (e.g., as disclosed in U.S. Pat. Nos. 5,159,053 and 5,863,466). Such inherently dissipative polymers (IDPs) have been shown to be fairly thermally stable and readily processable in the melt state in their neat form or in blends with other thermoplastic materials. Most of the known inherently conductive polymers (ICPs), such as polyaniline, polypyrrole and polythiophene, are not usually sufficiently thermally stable to be used in this invention. However, if the ICPs are thermally stabilized and are able to retain their electroconductive properties after melt processing at elevated temperatures, they could also be applied in this invention. Such polymers are described further in U.S. Pat. No. 6,207, 361 to Greener. Such polyetheresteramides, polyether block copolyamides and segmented polyether urethanes, in admixture with appropriate compatibilizers are useful in the present invention.

Any compatibilizer which can ensure compatibility between the polyether polymeric antistat (component A) and the extrudable polymer (component B) by way of controlling phase separation and polymer domain size can be employed. Some exemplary compatibilizers are described in U.S. Pat. No. 6,436,619 to Majumdar et al. hereby incorporated by reference. Some examples of compatibilizers are: polyethylene, polypropylene, ethylene/propylene copolymers, ethylene/butene copolymers, all these products being grafted with maleic anhydride or gycidyl methacrylate; ethylene/alkyl (meth)acrylate/maleic anhydride copolymers, the maleic anhydride being grafted or copolymerized; ethylene/vinyl acetate/maleic anhydride copolymers, the maleic anhydride being grafted or copolymerized; the two above copolymers in which anhydride is replaced fully or partly by glycidyl methacrylate; ethylene/ (meth)acrylic acid copolymers and optionally their salts; ethylene/alkyl (meth)acrylate/glycidyl methacrylate copolymers, the glycidyl methacrylate being grafted or copolymerized, grafted copolymers constituted by at least one mono-amino oligomer of polyamide and of an alpha-mono-olefin (co)polymer grafted with a monomer able to react with the amino functions of said oligomer. Such compatibilizers are described in, among others, EP-A-0,342, 066 and EP-A-0,218,665 which are also incorporated herein by reference. Some preferred compatibilizers are terpolymers of ethylene/methyl acrylate/glycidyl methacrylate and copolymers of ethylene/ glycidyl methacrylate, commercially available as Lotader from Atofina or similar products. Preferred compatibilizers also include maleic anhydride grafted or copolymerized polyolefins such as polypropylene, polyethylene, etc., commercially available as Orevac from Atofina or similar products.

According to one embodiment of the invention, the antistat tie layer and the outer layer (or dye-receiving layer) can be coextruded as follows. In a first step, a first melt and a second melt are formed, the first melt of a polymer being for an outer layer (or dye-image receiving layer) and the second melt comprising a thermoplastic antistat polymer having desirable adhesive and viscoelastic properties, preferably having not more than 10 times or 1/10, preferably not more than 3 times or less than 1/3 difference in viscosity from that of the first melt that forms the outer layer (or dye-receiving layer), thereby promoting efficient and high quality coextrusion. The tie layer, and its melt, preferably comprises a polymeric binder or matrix for the antistat polymer. The polymer binder can help to obtain the desired viscoelastic properties of the tie-layer melt, so that when extruded, the film does not extend beyond the edges of the coextruded film from the melt for the image-receiving layer, resulting in unmatched films. In such an event, a portion of an unmatched extruded film may be trimed off. However, this reduces, although not eliminating, the favorable economics for extrusion versus solvent coating. Unmatched edges between coextruded films may tend to occur when the viscosity ratio between coextruded melts is about 10:1. In comparison, if the ratio is reduced to about 3:1, for example by adding a binder to a Pellestat® antistat polymer, then the entire width of the films can be used without any trimming. The need or advantage for a polymer binder may be reduced or eliminated, however, if any of the following criteria are true: (1) the antistat polymer is sold at a higher molecular weight and, therefore, is inherently more viscous so that the melt for the tie layer exhibits a viscosity closer to that of the melt for the image-receiving layer; (2) the coating machine is narrower (for example, 12" vs 44"); (3) the viscosity of the image-receiving layer is reduced so that it matches that of the antistat polymer more closely; and/or (4) a multi-manifold die which introduces the polymer layers at the last possible second, ensuring greater uniformity. However, since the latter mechanical set up is relatively expensive, it may be preferred to use a coextrusion feedblock that mixes the polymers further upstream from the die lips. In a second step, the two melts are coextruded. In a third step, the coextruded layers or laminate is stretched to reduce the thickness. In a third step, the extruded and stretched melt is applied to a support for the image recording element or dye-receiving element while simultaneously reducing the temperature within the range below the Tg of the dye image receiving layer, for example, by quenching between two nip rollers. In a preferred embodiment, the support is a polyolefin-containing support.

A preferred embodiment of the invention is directed to a method of making a dye-receiving element for thermal dye transfer comprising a support and on one side thereof a dye image-receiving layer, wherein between the dye-image receiving layer and the support is a tie layer that was made by coextrusion with at least the dye-receiving layer, wherein the composition of the tie layer comprises a polyolefin-containing binder and a thermoplastic antistat polymer having preselected antistat, adhesive, and viscoelastic properties as described above. The total thickness of said dye-receiving layer in the final product is less than 10 microns, preferably 1 to 5 microns thick; the thickness of the tie layer is also preferably not more than 10 microns, preferably 1 to 5 microns thick.

In one preferred embodiment, the support for the dye-receiving element comprises a compliant substrate sheet over a base support and the support further comprises a backing layer on the base support.

The dye-receiver element can be made by a process comprising first forming a first melt of a polymer for a dye image receiving and a second melt comprising a thermoplastic antistat polymer in a polymeric matrix, secondly, coextruding the two melts onto a support, preferably comprising a polyolefin surface layer and, thirdly, stretching the coextruded layers to reduce the thickness uniaxially or biaxially, preferably uniaxially, for example, the coextruded layers can be stretched from a thickness of about 500 micrometers to about 3 micrometers. The extruded melt can be applied to a support for the dye-receiver element while simultaneously reducing the temperature within the range below the Tg of the dye image receiving layer, for example, by quenching between two nip rollers, wherein the tie-layer composition is as described above. Preferably, the support is a moving web and the film extruded over the moving web at a speed 30 meters per minute or more.

The particular structure of a dye-receiver element made according to the present invention can vary, but is generally a multilayer structure comprising, under the dye-image receiving layer, a support (defined as all layers below the dye-image receiving layer, not including any tie layer immediately adjacent the dye-image receiving layer) that comprises a composite compliant film, preferably comprising a microvoided layer, and (under the compliant film) a base support, preferably comprising a cellulose paper or resin coated paper.

A microvoided layer in the support can, for example, comprise crosslinked microbeads or non-crosslinked polymer particles that are immiscible with the polyester matrix of the microvoided layer. A microvoided layer provides more compliant properties to the receiver. This is important as it impacts the degree of contact to the thermal head during printing. Higher compliance results in better contact and higher dye transfer efficiency due to improved thermal transfer.

In a preferred embodiment, beneath one or more microvoided layers is a paper-containing base support, more preferably a resin-coated paper support. In addition, subbing layers or additional tie layers can be employed between adjacent layers within a section or between sections of the dye-receiver element. Typically, the support is greater than 100 micrometers, preferably greater than 200 micrometers, and most preferably 200 to 300 micrometers thick. Typically, the entire receiver element has a total thickness of from 20 to 400 micrometers, preferably 30 to 300 micrometers.

Typically, a support comprises cellulose fiber paper. Preferably, the support is from 120 to 250 $\mu$m thick and the applied (extruded) composite film (tie layer and dye-image receiving layer) is from 30 to 50 $\mu$m thick. The support can further comprise a backing layer, preferably a polyolefin backing layer on the side of the support opposite to the composite film and a tie layer between the support and the laminate film.

In one embodiment of the invention, the image receiving layer comprises a polyester material. A preferred polyester comprises (a) recurring dibasic acid derived units and polyol derived units, at least 50 mole % of the dibasic acid derived units comprising dicarboxylic acid derived units containing an alicyclic ring comprising 4 to 10 ring carbon atoms, which ring is within two carbon atoms of each carboxyl group of the corresponding dicarboxylic acid, (b) 25 to 75 mole % of the polyol derived units containing an aromatic ring not immediately adjacent to each hydroxyl group of the corresponding diol or an alicyclic ring, and (c) 25 to 75 mole % of the polyol derived units of the polyester contain an alicyclic ring comprising 4 to 10 ring carbon atoms.

Such polyester polymers for use in a dye-receiving element having a release agent according to the invention are condensation type polyesters based upon recurring units derived from alicyclic dibasic acids (Q) and diols (L) and (P) wherein (Q) represents one or more alicyclic ring containing dicarboxylic acid units with each carboxyl group within two carbon atoms of (preferably immediately adjacent to) the alicyclic ring and (L) represents one or more diol units each containing at least one aromatic ring not immediately adjacent to (preferably from 1 to about 4 carbon atoms away from) each hydroxyl group or an alicyclic ring which may be adjacent to the hydroxyl groups.

As used herein, the terms "dibasic acid derived units" and "dicarboxylic acid derived units," or "dicarboxylic acids' and "diacids," are intended to define units derived not only from carboxylic acids themselves, but also from equivalents thereof such as acid chlorides, acid anhydrides, and esters for these acids, as in each case the same recurring units are obtained in the resulting polymer. Each alicyclic ring of the corresponding dibasic acids may also be optionally substituted, e.g. with one or more $C_1$ to $C_4$ alkyl groups. Each of the diols may also optionally be substituted on the aromatic or alicyclic ring, e.g. by $C_1$ to $C_6$ alkyl, alkoxy, or halogen. Regarding the polyol/diol component (including all compounds having two or more OH or OH derived groups, including diols, triols, etc.), the total mole percentages for this component is equal 100 mole %. Similarly, regarding the acid component (including all compounds/units having two or more acid or acid-derived groups), the total mole percentages for this component is equal to 100 mole %.

In a preferred embodiment, the polyester used in the dye-image receiving layer comprises alicyclic rings in both the dicarboxylic acid derived units and the polyol derived units that contain from 4 to 10 ring carbon atoms. In a particularly preferred embodiment, the alicyclic rings contain 6 ring carbon atoms.

Such alicyclic dicarboxylic acid units, (Q), are represented by structures such as:

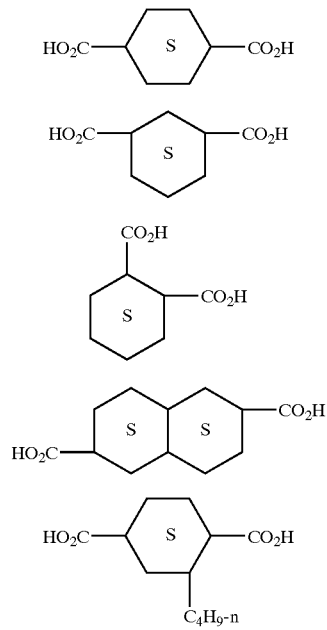

-continued

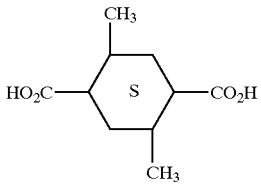

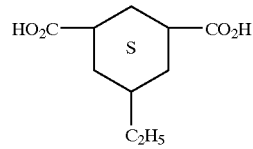

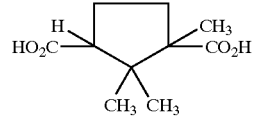

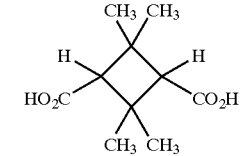

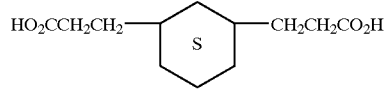

The aromatic diols, (L), are represented by structures such as:

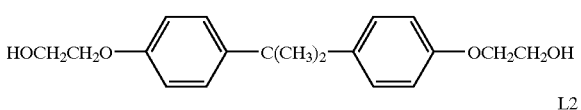

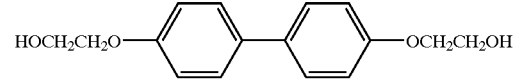

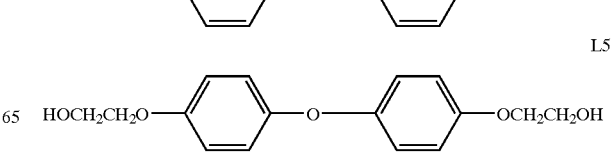

-continued

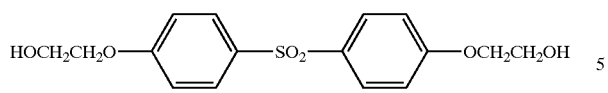
L6

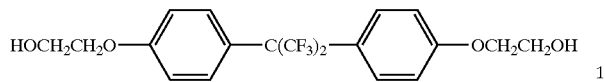
L7

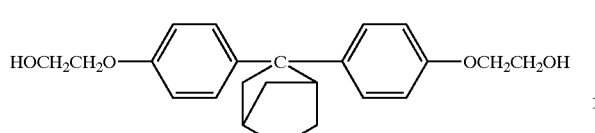
L8

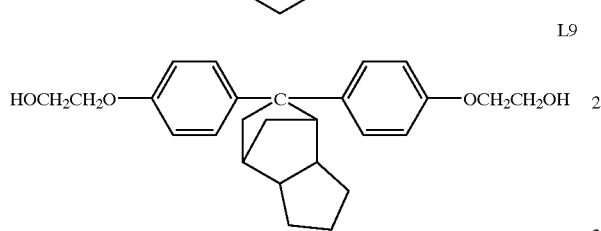
L9

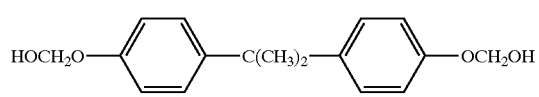
L10

L11

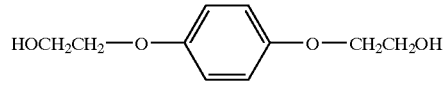
L12

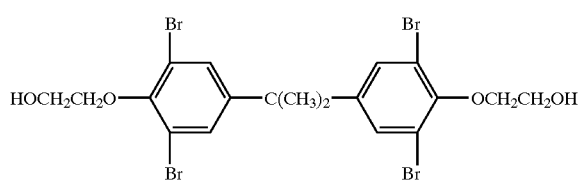
L13

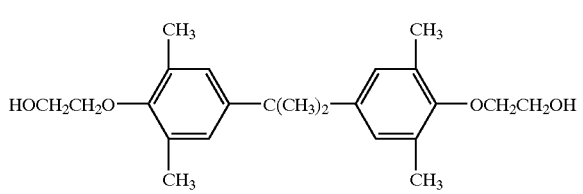
L14

The alicyclic diols, (P), are represented by structures such as:

P1

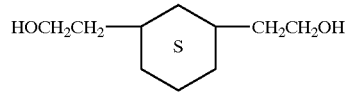
P2

-continued

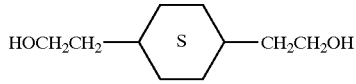
P3

P4

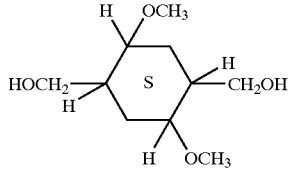
P5

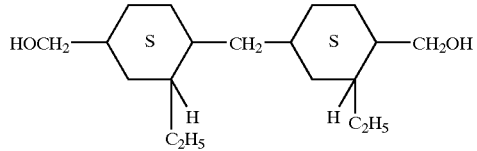
P6

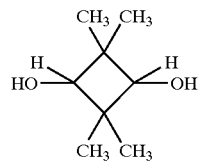
P7

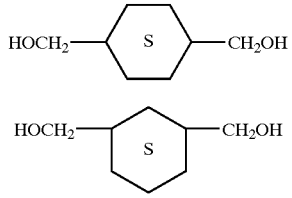
P8

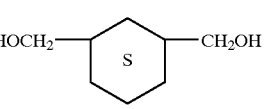
P9

In the case of an extrudable polyester, it has been found advantageous to employ monomers (as a replacement for either a diacid and/or diol that has three or more functional groups, preferably one more multifunctional polyols (N) or polyacids and derivatives thereof (O) that can provide branching. Multifunctional polyols, for example, include glycerin, 1,1,1-trimethylolethane, and 1,1,1-trimethylolpropane, or combinations thereof. Polyacids having more than two carboxylic acid groups (including esters or anhydrides derivatives thereof) include, for example, trimellitic acid, trimesic acid, 1,2,5-, 2,3,6- or 1,8,4-naphthalene tricarboxylic anhydride, 3,4,4'-diphenyltricarboxylic anhydride, 3,4,4'-diphenylmethanetricarboxylic anhydride, 3,4,4'-diphenylethertricarboxylic anhydride, 3,4,4'-benzophenonetricarboxylic anhydride acid and derivatives thereof. Multifunctional polyols or anhydrides, for example, include compounds represented by structures such as:

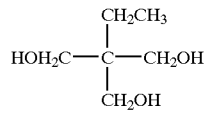
N1

-continued

N2

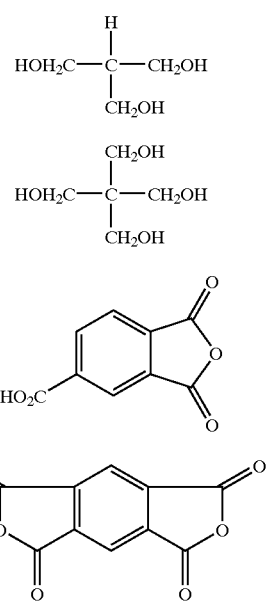

N3

O1

O2

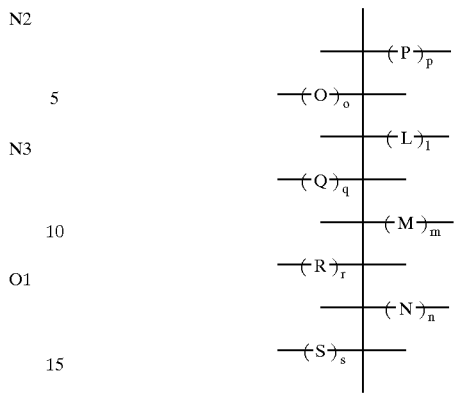

A small amount of aromatics, introduced by inclusion of aromatic diacids or anhydrides, is optional and is not preferred due to their tendency to reduce imaged dye density. Examples include, but are not limited to, terephthalic acid (S1) and isoterephthalic acid (S2).

Additional Diacids R and diols M may be added, e.g., to precisely adjust the polymer's Tg, solubility, adhesion, etc. Additional diacid comonomers could have the cyclic structure of Q or be linear aliphatic units or be aromatic to some degree. The additional diol monomers may have aliphatic or aromatic structure but are preferably not phenolic.

Some examples of suitable monomers for R include dibasic aliphatic acids such as:

R1: $HO_2C(CH_2)_2CO_2H$
R2: $HO_2C(CH_2)_4CO_2H$
R3: $HO_2C(CH_2)_7CO_2H$
R4: $HO_2C(CH_2)_{10}CO_2H$

Some examples of some other suitable monomers for M include diols such as:

M1: $HOCH_2CH_2OH$
M2: $HO(CH2)3OH$
M3: $HO(CH_2)_4OH$
M4: $HO(CH_2)_9OH$
M5: $HOCH_2C(CH_3)_2CH_2OH$
M6: $(HOCH_2CH_2)_2O$
M7: $HO(CH_2CH_2O)_nH$ (where n=2 to 50)

The above-mentioned monomers may be copolymerized to produce structures such as:

wherein o+q+r+s=100 mole percent (based on the diacid component) and p+m+n+1=100 mole percent (based on the polyol component). With respect to the diacid, preferably q is at least 50 mole percent, r is less than 40 mole percent, and s is less than 10 mole percent. With respect to the polyol, preferably p is 25 to 75 mole percent, 1 is 25 to 50 mole percent, and m is 0 to 50 mole percent. With respect to the polyfunctional monomers (having more than two functional groups), the total amount of n or o is preferably 0.1 to 10 mole percent, preferably 1 to 5 mole percent.

The polyesters of the invention preferably, except in relatively small amounts, do not contain an aromatic diacid such as terephthalate or isophthalate.

The polyester preferably has a Tg of from about 40 to about 100° C. In a preferred embodiment of the invention, the polyesters have a number molecular weight of from about 5,000 to about 250,000, more preferably from 10,000 to 100,000.

In addition to the polymeric binder described above, the receiving layer may also contain other polymer such as polycarbonates, polyurethanes, polyesters, polyvinyl chlorides, poly(styrene-coacrylonitrile), poly(caprolactone), etc. For use in polyester-polycarbonate blends, examples of unmodified bisphenol-A polycarbonates having a number molecular weight of at least about 25,000 include those disclosed in U.S. Pat. No. 4,695,286. Specific examples include MAKROLON 5700 (Bayer AG) and LEXAN 141 (General Electric Co.) polycarbonates.

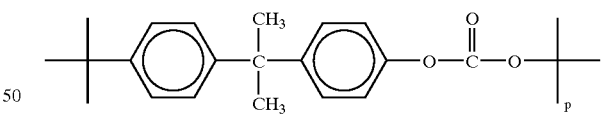

Lexan® 141: p~120, Tg~150° C.
Makrolon® 5700: p~280, Tg~157° C.

In the case of blends with a polycarbonate, the polycarbonate preferably has a Tg of from about 100 to about 200° C., in which case the polyester preferably has a lower Tg than the polycarbonate, and acts as a polymeric plasticizer for the polycarbonate. The Tg of the final polyester/polycarbonate blend is preferably between 40° C. and 100° C. Higher Tg polyester and polycarbonate polymers may be useful with added plasticizer.

In one embodiment of the invention, a polyester polymer is blended with an unmodified bisphenol-A polycarbonate and at a weight ratio to produce the desired Tg of the final blend and to minimize cost. Conveniently, the polycarbonate and polyester polymers may be blended at a weight ratio of from about 90:10 to 10:90, preferably 80:20 to 20:80, more preferably from about 75:25 to about 25:75.

The following polyester polymers E-1 through E-14, comprised of recurring units of the illustrated monomers, are examples of polyester polymers usable in the receiving layer polymer blends of the invention.

E-1 through E-3: A polymer considered to be derived from 1,4-cyclohexanedicarboxylic acid, 1,4-cyclohexanedimethanol, 4,4'-bis(2-hydroxyethyl) bisphenol-A and 2-ethyl-2-(hydroxymethyl)-1,3-propanediol

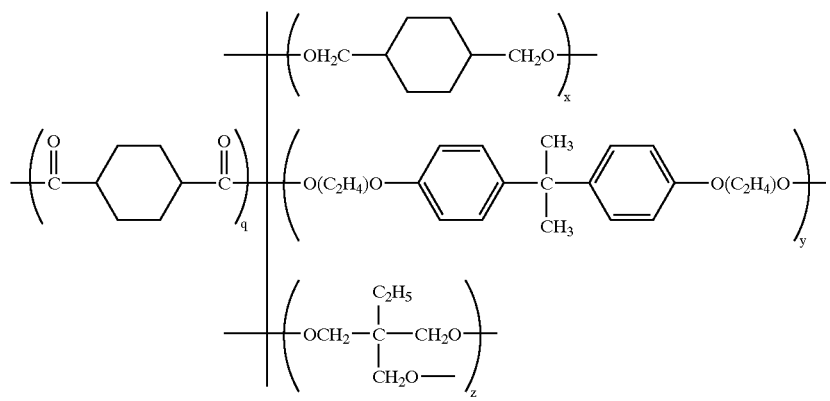

E-1: x=48 mole % y=50 mole % z=2 mole %
E-2: x=46 mole % y=50 mole % z=4 mole %
E-3: x=44 mole % y=50 mole % z=6 mole %

E-4 through E-6: A polymer considered to be derived from 1,4-cyclohexanedicarboxylic acid, 1,4-cyclohexanedimethanol, 4,4'-bis(2-hydroxyethyl) bisphenol-A and glycerol

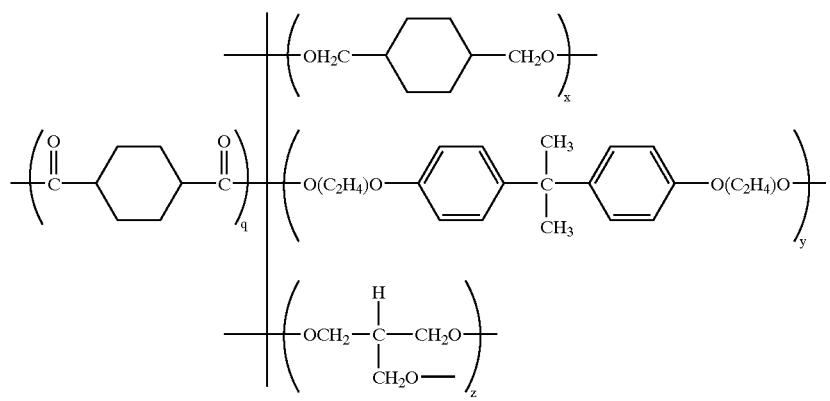

E-4: x=48 mole % y=50 mole % z=2 mole %
E-5: x=46 mole % y=50 mole % z=4 mole %
E-6: x=44 mole % y=50 mole % z=6 mole %

E-7 through E-8: A polymer considered to be derived from 1,4-cyclohexanedicarboxylic acid, 1,4-cyclohexanedimethanol, 4,4'-bis(2-hydroxyethyl) bisphenol-A and pentaerythritol

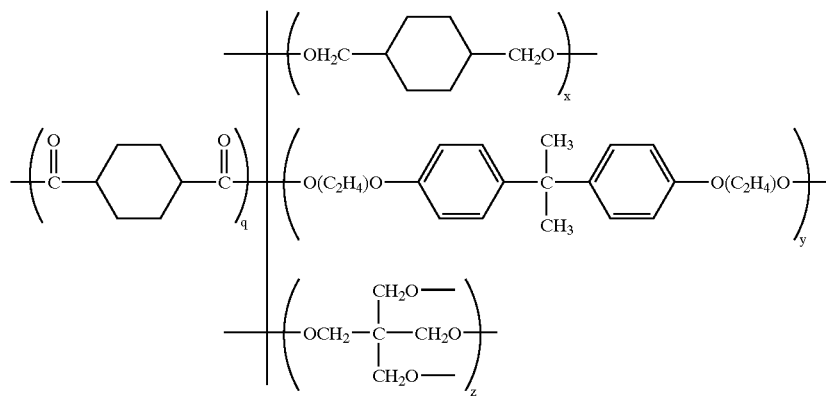

E7: x=48 mole % y=50 mole % z=2 mole %
E-8: x=46 mole % y=50 mole % z=4 mole %

E-9 through E-11: A polymer considered to be derived from 1,4-cyclohexanedicarboxylic acid, trimellitic anhydride, 1,4-cyclohexanedimethanol and 4,4'-bis(2-hydroxyethyl)bisphenol-A.

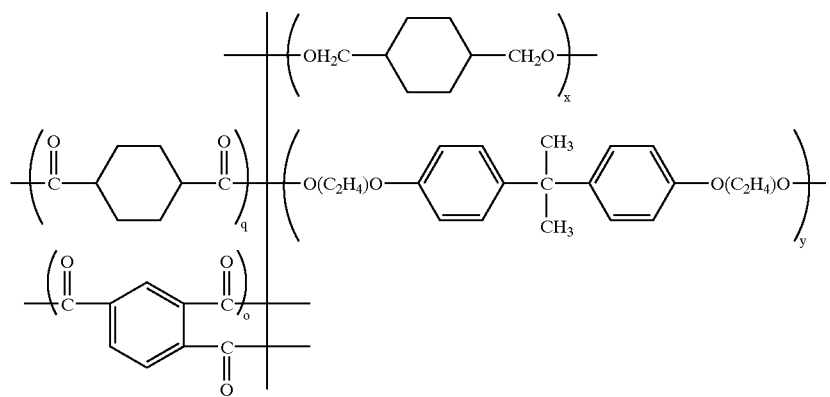

E-9: q=98 mole % o1=2 mole % x=50 mole % y=50 mole %

E-10: q=98 mole % o1=4 mole % x=50 mole % y=50 mole %

E-11: q=94 mole % o1=6 mole % x=50 mole % y=50 mole %

E-12 through E-14: A polymer considered to be derived from 1,4-cyclohexanedicarboxylic acid, pyromellitic anhydride, 1,4-cyclohexanedimethanol and 4,4'-bis(2-hydroxyethyl)bisphenol-A.

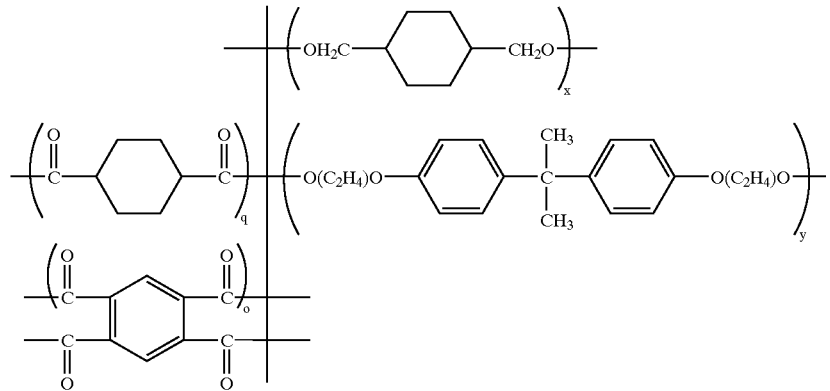

E-12: q=98 mole % o2=2 mole % x=50 mole % y=50 mole %

E-13: q=96 mole % o2=4 mole % x=50 mole % y=50 mole %

E-14: q=94 mole % o2=6 mole % x=50 mole % y=50 mole %

The following Table summarizes the various polyesters that are used as the binder in the dye-image receiving layer in preferred embodiments of the invention.

| Cmpd | Alicyclic Diacid Mole % Q | Anhydride Mole % O | Alicyclic Glycol Mole % X | Aromatic Glycol Mole % Y | Additional Glycol Mole % M | Branching Agent Mole % M1, M2, M3 |
|---|---|---|---|---|---|---|
| C-1 | 100 | 0 | 50 | 50 | 0 | 0 |
| C-2 | 100 | 0 | 30 | 50 | M2 = 20 | 0 |
| C-3 | 100 | 0 | 25 | 50 | M6 = 25 | 0 |
| E-1 | 100 | 0 | 49 | 50 | 0 | N1 = 1 |
| E-2 | 100 | 0 | 48 | 50 | 0 | N1 = 2 |
| E-3 | 100 | 0 | 47 | 50 | 0 | N1 = 3 |
| E-4 | 100 | 0 | 49 | 50 | 0 | N2 = 1 |
| E-5 | 100 | 0 | 48 | 50 | 0 | N2 = 2 |
| E-6 | 100 | 0 | 47 | 50 | 0 | N2 = 3 |
| E-7 | 100 | 0 | 49 | 50 | 0 | N3 = 1 |
| E-8 | 100 | 0 | 48 | 50 | 0 | N3 = 2 |
| E-9 | 98 | O1 = 2 | 50 | 50 | 0 | 0 |
| E-10 | 98 | O1 = 4 | 50 | 50 | 0 | 0 |
| E-11 | 96 | O1 = 6 | 50 | 50 | 0 | 0 |
| E-12 | 98 | O2 = 2 | 50 | 50 | 0 | 0 |
| E-13 | 96 | O2 = 4 | 50 | 50 | 0 | 0 |
| E-14 | 94 | O2 = 6 | 50 | 50 | 0 | 0 |

The following polymers C-1, C-2, and C-3 shown below are for comparison to the polymers of the invention.

C-1: Polymer considered to be derived from 1,4-cyclohexanedicarboxylic acid, 4,4'-bis(2-hydroxyethyl) bisphenol-A and 1,4-cyclohexanedimethanol.

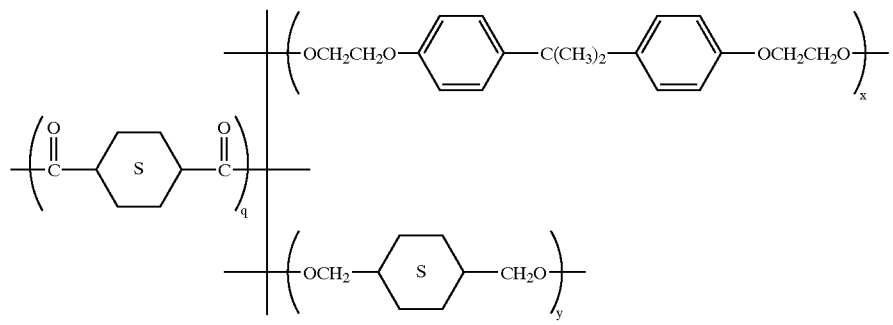

C-1: x=50 mole % m=50 mole %

(mole % based on total monomer charge of acid and glycol monomers)

C-2: Polymer considered to be derived from 1,4-cyclohexanedicarboxylic acid, 4,4'-bis(2-hydroxyethyl) bisphenol-A, 1,4-cyclohexanedimethanol and 2,2'-oxydiethanol.

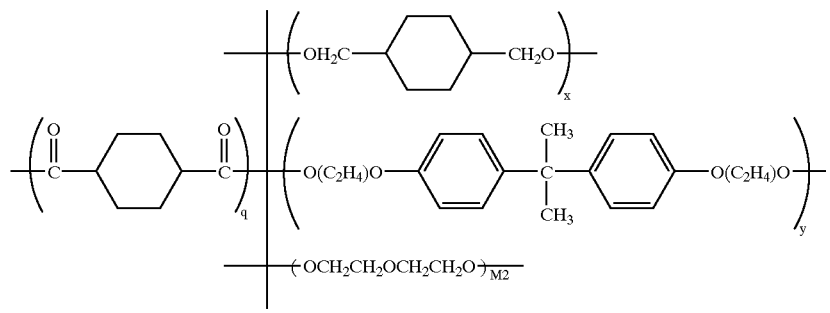

C-2: x=25 mole % y=50 mole % m2=25 mole %

C-3: Polymer considered to be derived from 1,4-cyclohexanedicarboxylic acid, 4,4'-bis(2-hydroxyethyl) bisphenol-A, 1,4-cyclohexanedimethanol and 1,3-propanediol

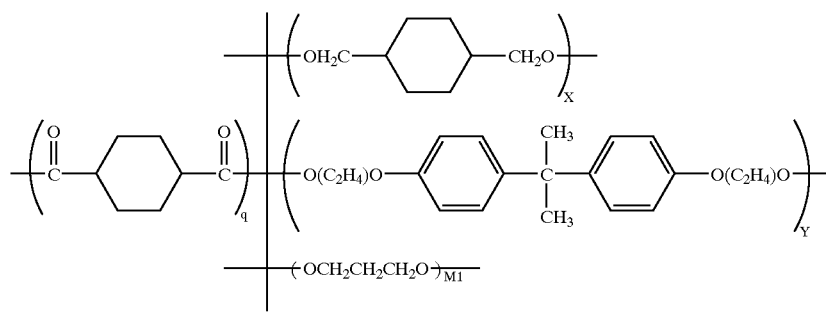

C-3: x=30 mole % y=50 mole % m1=20 mole %

The image-receiving layer may be present in any amount which is effective for its intended purpose. In general, good results have been obtained at a receiving layer concentration of from about 0.5 to about 20 g/m²., preferably 1 to 15 g/m², more preferably 3 to 10 g/m².

The receiving layer of the invention may also contain a release agent, such as a silicone or fluorine based compound, as is conventional in the art. Resistance to sticking during thermal printing may be enhanced by the addition of such release agents to the dye-receiving layer or to an overcoat layer. Various releasing agents are disclosed, for example, in U.S. Pat. No. 4,820,687 and U.S. Pat. No. 4,695,286, the disclosures of which are hereby incorporated by reference in their entirety.

A preferred release agent, especially for an extruded dye-receiving layer, are ultrahigh molecular weight silicone-based compounds. Preferably, the weight average molecular weight of the compound or polymer should be at least 100,000, more preferably at least 500,000, most preferably at least 1,000,000, for example, between 1,000,000 and 5,000,000. The silicone release agent should be as compatible as possible with the polymers used in the dye receiving layer. When the dye-receiving layer contains a polycarbonate, it is preferred for the release agent to have hydroxy terminal groups to improve the compatibility of the silicone compound in the polycarbonate-containing blend.

High or ultrahigh molecular weight silicone release agents are commercially available, for example, from Dow Coming (Midland, Mich.), including MB50-315 and MB-010. MB50-315 is a hydroxy-terminated dimethyl siloxane polymer. However, depending on the composition of the dye-receiving layer, organic end groups may be used, for example, including methyl and phenyl.

MB50-315 silicone material is commercially available as a 50 weight percent mixture of pelletized solid polydimethylsiloxane dispersed in polycarbonate polymer. Depending on the composition of the dye-receiving layer, other dispersions may be preferred, for example, MB50-010 from Dow Coming which is a dispersion in polyester. Suitably, the release agent is used in amounts of 0.5 to 10 percent, preferably 2 to 10, most preferably 3 to 8 percent, by weight solids in the dye-receiving-layer composition. Some of the release agent may be lost during manufacture of the dye-receiving element. Typically, a sufficient portion of the release agent will migrate to the surface of the dye-receiving layer to prevent sticking during thermal dye transfer. Siloxane release agents are disclosed in concurrently filed copending commonly assigned U.S. Ser. No. 10/376,186 of Arrington et al., hereby incorporated by reference.

A plasticizer may also be present in the dye image-receiving layer in any amount which is effective for the intended purpose. In general, good results have been obtained when the plasticizer is present in an amount of from about 3 to about 100%, preferably from about 4 to about 30%, based on the weight of the polymeric binder in the dye-image receiving layer.

In one embodiment of the invention, an aliphatic ester plasticizer is employed in the dye-image receiving layer. Suitable aliphatic ester plasticizers include both monomeric esters and polymeric esters. Examples of aliphatic monomeric esters include ditridecyl phthalate, dicyclohexyl phthalate and dioctylsebacate. Examples of aliphatic polyesters include polycaprolactone, poly(butylene adipate) and poly(hexamethylene sebacate).

In a preferred embodiment of the invention, the monomeric ester is dioctylsebacate. In another preferred embodiment, the aliphatic polyester is poly(1,4-butylene adipate) or poly(hexamethylene sebacate).

U.S. Pat. No. 6,291,396 to Bodem et al. discloses various aliphatic ester plasticizer, including polyesters or monomeric esters. Phthalate ester plasticizers are disclosed in U.S. Pat. No. 4,871,715 to Harrison et al., which plasticizers may be used in a receiving layer alone or as mixtures.

In the case of dye-receiving layers made by extruding rather than by solvent coating the dye-receiving layer, then it has been found advantageous to include, as an additive to the composition of the dye-receiving layer, a phosphorous-containing stabilizer. Thus, in one embodiment of the invention, a thermal-dye-transfer receiving element according to the present invention comprises an extrudable composition for the receiving layer made from a polycarbonate-polyester blend which contains a phosphorous-containing stabilizer such as phosphorous acid or an organic diphosphite such as bis(2-ethylhexyl)phosphite, to prevent undue branching of the polyester polymer blend during high temperature melt extrusion. The extruded receiving layer is applied simultaneously with an extruded tie layer to a moving web comprising a multilayer support. The phosphorous stabilizer can be combined, for example, with a plasticizer such as dioctyl sebacate or the like. Preferably, to improve compatibility, the plasticizer is combined with the stabilizer prior to combining both with the other components of the dye receiving layer.

U.S. Pat. No. 5,650,481 describes the use of polyester resins prepared in the presence of a catalyst/stabilizer system containing one or more phosphorous compounds. Included within the definition of phosphorous compounds are phosphorus-based stabilizers such as alkyl phosphates, aryl phosphates, inorganic phosphates, phosphates, phosphoric acid and phosphoric acid esters, especially phosphates and phosphoric acid, and phosphorous acid. Preferred in the present invention are organic diphosphites, more preferably an alkyl diphosphate, most preferably wherein the alkyl group has 1 to 11 carbon atoms.

Various polymerization catalysts can be used to make the above-described polyesters for the dye-image receiving layer. Optionally, a plurality of polymers may be blended for use in the dye receiving layer in order to obtain the advantages of the individual polymers and optimize the combined effect, as indicated above. A problem with such a polymer blend, however, may result if the polymers chemically transesterify with each other during compounding and extrusion. A by-product of such a reaction may be the liberation of carbon dioxide and the formation of yellow color in the blend, which have a deleterious effect on the melt curtain formed during the extrusion process. Both of these problems are exacerbated by the use of titanium catalysts during the syntheses of the polyester used in the blend. It has been found, therefore, that the use of non-esterified diacids in the synthesis of the polyester allows the use of tin and other less deleterious catalysts than titanium, which catalysts, preferably coupled with phosphorous stabilizers, help in the elimination of polymer transesterification. Polyester/polycarbonate blends which exhibit transesterification can not be effectively extruded. Use of diacids with effective catalysts and stabilizers can help to eliminate this adverse reaction.

Despite the fact that the diester monomer used in the synthesis of the polyester is less expensive, requires less heat, and is general more amenable to polymer preparation, it has, therefore, been found unexpectedly advantageous for the polyester in the dye-image receiving layer to be made employing, mainly or entirely, the diacid monomers in the form of the diacid monomer instead of the diester monomer and to employ tin or other non-titanium catalysts as the polymerization catalyst. As mentioned above, the use of the diacid and tin catalyst was able to prevent or minimize the transesterification exacerbated by the titanium catalyst. Suitably the catalyst is added in the amount of 0.01 to 0.08% by weight solids to the polymerization composition.

The dye-image receiving layer can be applied to a support for the receiver by a solvent coating process. In a preferred embodiment, however, the dye-receiving layer, preferably both the dye-receiving layer and a tie-layer, may be made by an extrusion process. Such a process is described as follows. Prior to extruding the dye-image receiving layer onto a substrate, the polyester material used to make the dye receiving layer should be dried to reduce hydrolytic degradation in the extrusion process. The drying process suitably occurs at a temperature slightly below the glass transition temperature of the polyester so that the polyester particles remain free flowing through the dryer. Because the drying temperatures of these polyester are so low, the use of desiccated gas or vacuum is preferred. For example, for a polyester with a glass transition temperature of 56° C., a drying temperature of 43° C. for 12 hours using air with a dewpoint of −40° C. in a NOVATEC CDM-250 dryer is found to be adequate.

The greater the drying time, the lower the loss in molecular weight and viscosity. Since higher molecular weight results in extrusion temperatures which are higher, more drying is advantageous. Typically, the higher the extrusion temperature, the less melt viscosity present and the higher the extrusion speed during commercial manufacture.

The polycarbonates used in this embodiment, such as LEXAN 151 from GE Plastics should also be dried prior to use. The polycarbonate, for example, is suitably dried at 120° C. for 2 to 4 hours.

If a polycarbonate based released agent is used, such as Dow Corning MB50-315 siloxane, then this material can be premixed into the polycarbonate at the proper ratio, and dried under the same conditions as the polycarbonate.

In one embodiment of a process according to the present invention, all of the components of the dye receiving layer are melt mixed in a compounding operation. To achieve adequate distributive and dispersive mixing, a twin screw co-rotating mixer is typically used, although a counter-rotating mixer, or kneader may also be appropriate. These mixers can be purchased from a variety of commercial vendors including Leistritz, Werner & Pfleiderer, Buss, and other companies.

The order of addition of the materials into a compounder is preferably as follows. The polycarbonate and the polyester are added separately to prevent or minimize the formation of a network that can reduce the ease of extrusion of the dye receiving layer, and to minimize the propensity for donor-receiver sticking. If the polycarbonate is sequentially added first, it is recommended that a stabilizer, such as phosphorous acid or bis-ethyl hexyl phosphite is added and well mixed in the polycarbonate before addition of the polyester. This reduces network formation. Similarly, if the polyester is added first, then is desirable that a stabilizer is well mixed into the polyester before the addition of the polycarbonate.

At the ports of the compounder where solids are introduced, the screw should be designed to convey the solids away from the feeder, then melt them, then mix them into the rest of the components. At the point where the solids enter the compounder, it must also be easy to allow entrained air to escape. We prefer to use the sequence of conveying elements, kneading blocks, and reversing elements at any solids addition. This gives an acceptable combination of distributive and dispersive mixing, melting, and air elimination. Where the liquid is injected into the extruder, the use of gear elements is advantageous. These have excellent distributive mixing characteristics. If the optional vacuum port is used, conveyance elements with reverser elements on both sides is used. The purpose of the reversers is to form a melt seal so that a vacuum can be maintained in the extruder. Finally, conveyance elements are used to build up pressure using a drag flow mechanism so that the combined die receiving layer can be extruded through the strand die into the water bath.

As indicated above, in terms of order of addition, there is a choice between adding the polyester first or the polycarbonate first (with the understanding that the stabilizer is added with the first material, or between materials). Since the polycarbonate has a much higher processing temperature, it is preferable to add this to the extruder first. This is because it is easier to melt a low melting material (polyester) into an already molten high melting material (polycarbonate) than vice versa. When a first polymer is added to another premelted second polymer, the mechanism of the melting of the first polymer is largely due to heat transfer. Since this is an inefficient way of melting a polymer, the higher melting point polymer should usually be melted first.

The stabilizer does not necessarily have to be added with a liquid plasticizer. At least two other techniques can be employed. If the manufacturing rate is large enough, the stabilizer can simply be added by itself. This can be accomplished with existing commercial feeders if the overall compounding rate is on the order of 1000 kg/hr. If this rate is unreasonable, and other means of introducing the stabilizer are desired, a stabilizer concentrate can be made and introduced between the polyester or polycarbonate. The disadvantage of using this technique is that the properties of the stabilizer concentrate degrade rapidly with time, so the stabilizer concentrate should be used immediately.

The melt temperature of the compounding operation should be kept under 300° C. to prevent crosslinking and thermal degradation.

Since the amount of stabilizer which is added is often a small number (0.01% to 1%), it is desirable that a convenient way be found of adding the stabilizer so that the mass flow rate of the stabilizer is high enough that commercially available equipment can deliver it. Unless the process is run at very high rates, one advantageous way to achieve this is by diluting the stabilizer in another material so that the feed rates required become coincident with commercially available equipment. Furthermore, it is extremely convenient if the stabilizer is soluble in the liquid plasticizer that is used, such as dioctyl sebacate.

The composition for the dye-receiving layer can be compounded in by adding a mixture of the polycarbonate and a polycarbonate based release agent in the first port of a twin screw extruder. Since these materials are often in pellet form, a standard weight loss feeder can be used. In a second port, located downstream from the first port, a liquid plasticizer/stabilizer mixture can be added to the twin screw extruder. The plasticizer/stabilizer mixture can be held in a tank, which needs to be well stirred and at high temperature if the plasticizer and stabilizer do not form thermodynamically soluble solutions. The plasticizer/stabilizer mixture is preferably pumped into the extruder using a positive displacement reciprocating or centrifugal pump. A centrifugal pump is most preferred, since this will give a more uniform flow of material than a reciprocating pump. Positive displacement pumps require a minimum pressure to pump against to assure uniform flow. This pressure is achieved by pumping the liquid through a narrow orifice prior to introducing it into the extruder.

Next, during compounding, the polyester is introduced in a third port of the extruder, which is downstream from the second port. Since the polyester can have a low glass transition temperature, it may be necessary to cool this port using water cooling so the polyester does not overheat. This allows the polyester to flow freely into the extruder. However, cooling too much may cause coagulation which would block the flow. In this third port, provision should be made for the air entrained in the polyester pellets, granules, or powder to escape. The polyester is most often introduced in a screw fed side feeder, with an air vent on top. In this instance, the side feeder must be water cooled. An optional fourth port may exist in which a vacuum is applied. The purpose of this vacuum is to remove volatiles from the system.

In accordance with the preferred embodiment, the melted material for the dye-image receiving layer is then extruded from the exit of the compounder through a strand die into warm water, which cools the dye receiving layer enough to pelletize it downstream. If the water is too cold, the melt strand becomes brittle and breaks in the water bath. If the water is too warm, the melt strand becomes too soft and cannot be pelletized correctly. The material can then be pelletized into roughly rice sized particles which can later be dried and fed into a single screw extruder for extrusion coating the dye-receiving layer.

The pelletized composition for the dye-image receiving layer is now preferably aged. This aging is manifested by the reduction of the melt viscosity of the polymer with time. The measured melt viscosity of the composition for the receiving layer could be up to 50% lower after one week of aging than when it is initially manufactured. After approximately one week, the material ceases to lose viscosity and stays relatively constant. If the material is extrusion coated before it is aged, the melt viscosity, pressure drop, and throughput could be undesirably variable. It is therefore preferable to wait until the composition for the dye-image receiving layer ("DRL") is adequately aged.

In the preferred process, then, the "DRL pellets", i.e., the pellets for making the DRL or dye-image receiving layer, are predried before extrusion. Since the glass transition temperature of the pellets are often from 30–50° C., it is difficult to thoroughly dry them. It is therefore advantageous to use vacuum or desiccated gases at low temperatures for long periods of time to achieve the desired drying. If a desiccant dryer is used, it is often found that during the desiccant recharge cycle the temperature will spike above the glass transition temperature of the air for a short period of time. This temperature spike, however, is often enough to fuse the dye receiver pellets together, and prevent the desired free flowing characteristics that compounded pellets should have. To avoid this problem, it is advisable to install a secondary heat exchanger to reduce the air temperature during the desiccant recharge cycle.

Drying temperatures of above about 40° C. for greater than about 4 hours are typical. The dried material must then be conveyed in a low moisture environment to the extruder. Dry air, nitrogen, or vacuum feeding can all be used. The purpose of this low-moisture condition is both to prevent the dye receiver pellets from reacquiring moisture from the air, and to prevent condensation on the pellets due to the cold feeder temperatures which follow.

The DRL pellets can have an unusual combination of low glass transition temperature and low coefficient of friction due to the release agent present in the formula. This combination of properties may require different extrusion conditions from those used in most commercial extrusion applications of olefins or polyesters. The DRL polymer material will often preferentially adhere to the extruder screw at a distance of one to five diameters down the screw. The polymer material can build up and eventually form a "slip ring", which is a cylindrical torroid adhering to the screw. This torroid can then form a barrier that prevents other DRL pellets from passing through the extruder. The result is that flow stops, and polymer degrades inside the hot extruder for long periods of time. Obviously, this is not a tolerable situation in a steady state manufacturing operation. In order to alleviate this problem, therefore, it is advantageous to keep the DRL pellets at a temperature below the glass transition temperature until sufficient pressure builds up in the extruder to "push" the pellets past the point on the screw where they are inclined to build up. This can be accomplished by cooling the first one to five diameters in length with cooling water at about 20° C. Both the extruder barrel and the extruder screw are cooled. In addition, if the diameter of the extruder is less than or equal to about 25 mm, the feed section of the screw must be modified to increase the depth for feeding, and to decrease the amount of heat transferred from the barrel to the screw. The compression ratio of the screws used for extruding the dye receiver pellets preferably has a compression ratio of more than 5.0 if the diameter of the extruder is less than 25 mm.

After the initial cooling zone, the remainder of the extruder can be run normally, for example, at a melt temperature between 230° C. and 310° C.

Meanwhile, according to the preferred embodiment of the process of the invention, a substrate sheet, for under the dye-receiving layer, is prepared comprising a microvoided composite film, commercially available from Mobil, which substrate sheet is laminated to the base support of the dye-receiver element of the invention which base support may be a polymeric, a synthetic paper, or a cellulose fiber paper support, or laminates thereof, as indicated below. Preferred cellulose fiber paper supports include those disclosed in Copending, commonly assigned U.S. Ser. No. 07/822,522 of Warner et al. the disclosure of which is incorporated by reference.

When using a cellulose fiber paper base support, it is preferable to extrusion laminate the microvoided composite films using a polyolefin resin. During the lamination process, it is desirable to maintain minimal tension of the microvoided packaging film in order to minimize curl in the resulting laminated receiver support. The back side of the paper support (i.e., the side opposite to the microvoided composite film and receiving layer) may also be extrusion coated with a polyolefin resin layer (e.g., from about 10 to 75 g/m$^2$), and may also include a backing layer such as those disclosed in U.S. Pat. Nos. 5,011,814 and 5,096,875, the disclosures of which are incorporated by reference. For high humidity applications (greater than 50% RH), it is desirable to provide a backside resin coverage of from about 30 to about 75 g/m$^2$, more preferably from 35 to 50 g/m$^2$, to keep curl to a minimum.

Thus, in order, from top to bottom, the dye-receiver element can comprise a dye-image receiving layer, a substrate sheet primarily (in terms of thickness) comprising a microvoided layer, and a base support which is primarily not microvoided (preferably containing paper), and a backing layer.

In one preferred embodiment, in order to produce receiver elements with a desirable photographic look and feel, it is preferable to use relatively thick paper supports (e.g., at least 120 $\mu$m thick, preferably from 120 to 250 $\mu$m thick) and relatively thin microvoided composite packaging films (e.g., less than 50 $\mu$m thick, preferably from 20 to 50 $\mu$m thick, more preferably from 30 to 50 $\mu$m thick).

If the dye-image receiving layer is extruded directly onto the support, adhesion will be poor. Therefore, a tie layer as described above may be used. Conventional tie-layer materials may be used for the tie layer, including various polyolefins, LD polyethylene, ethylene methacrylic acid, etc. However, it has been found advantageous for a tie layer to also provide antistat properties in addition to adhesive properties. This prevents the overall structure from high static electricity, which would cause problems with dust attraction and conveyance.

It has, therefore, been found advantageous to use a combination adhesion/antistat layer (referred to herein as a "antistat tie layer") with the dye-receiving layer of the present invention. Optionally, this antistat tie layer may be coextruded with the dye receiving layer.

As indicated above, a requirement for robust coextrusion is that the viscosities of the materials roughly match. A rule of thumb is that the ratio of viscosities should be less than about 3 to 1. Unfortunately, the viscosity ratio of the material for the dye receiving layer to the polyether polyolefin block copolymer is about 10:1, which is difficult to coextrude, especially with a wide extrusion die using a coextrusion feedblock. Applicants have found that addition of a low-melt-rate thermoplastic such as polypropylene with a melt flow rate of 1.9 g/10 min as measured by ASTM Test Method D1238 or other thermoplastic polymer to the polyether polyolefin copolymer helps both the viscosity matching and the adhesion. A mixture consisting of about 20 to 80%, preferably about 70% by weight, of the polyether polyolefin copolymer with about 80 to 20%, preferably about 30% by weight, of the polypropylene exhibits acceptable antistat properties, adhesion and viscosity.

In one embodiment of the invention, an antistat tie layer is preferably prepared by drying the above described PELLESTAT polyether polyolefin block copolymer at an elevated temperature, for example about 80° C., for an extended time, for example, about 4 hours or more. After drying, it can be dry blended with the copolymer such as polypropylene, and added to a conventional single screw extruder where it is preferably heated to a temperature of between 230 and 310° C.

The antistat tie layer and the dye receiving layer can then be coextruded to form a laminate film. Coextrusion can be accomplished employing a coextrusion feedblock or a multimanifold die, as explained, for example, in *Extrusion Coating Manual* (4$^{th}$ Ed. Tappi Press) pg. 48, hereby incorporated by reference. A coextrusion feedblock is more versatile and less expensive, but a multimanifold die can handle higher viscosity differences between layers. A coextrusion feedblock can be operated so that the flow pins are allowed to float freely, reaching equilibrium depending on flow rate and kinematic viscosity.

The thickness ratio between the dye receiving layer and the antistat tie layer can be chosen depending on a number of factors. In terms of processing, the higher the thickness of the dye receiving layer, the lower the draw resonance.

The dye-receiving layer preferably is extruded at a thickness of at least 100 micrometers, preferably 100 to 800 micrometers, and then uniaxially stretched to less than 10 microns, preferably 3–4 microns.

If an antistat tie layer is used, it may be difficult to control the cross direction thickness uniformity because of the nature of the material, particularly when the viscosity ratio of the dye-receiving layer to the antistat tie layer is above about 5:1. Therefore, a preferred ratio of less than 5:1, preferably about 3:1, is preferred.

After the layer ratio is adjusted in the coextrusion feedblock, the tie layer and the dye-image receiving layer proceed to the extruder die. The geometry of the die lip affects the overall quality of the extruded product. Usually, the greater the die gap, the higher the draw resonance. However if the die gap is too small, the pressure drop will be excessive and melt fracture may result in an unsightly feature called "shark skin". Also, the land length of the die can affect the streakiness of the extruded product. The longer the land length, the more streaky the product may appear. For the extrusion step, a die gap from 0.25 to 1.0 mm, with a land length of about 2.5 mm is preferably employed.

After the tie layer/die receiving layer is coextruded, it can be drawn down to a thickness of about 4 μm by a nip, for example, consisting of a rubber roll and larger metal roll. In the preferred embodiment, a rubber roll and a metal roll is water cooled to avoid excessive heat generation and to facilitate good release. The temperature of the melt curtain can affect the ability to achieve a robust coating. If the melt curtain is too hot, the melt strength may be too low and the melt curtain may break. If the melt curtain is too cold, then the melt curtain may break in brittle fracture. Applicants have found a melt temperature of between 230° C. and 310° C. provide advantageously good operating characteristics. A coating speed of greater than 200 m/min is easily attainable under these conditions.

Next, the extruded material is applied to the overall support described above. The final product can be conveniently wound into a roll and subsequently slit into sheets or rolls depending on the specific printer the receiver element is being made for.

A dye-receiving element made in accordance with the present invention can be used in a process of forming a dye transfer image comprising imagewise-heating a dye-donor element comprising a support having thereon a dye layer and transferring a dye image to the dye-receiving element to form said dye transfer image.

Thermal printing heads which can be used to transfer dye from dye-donor elements to receiving elements made by the present process are available commercially. There can be employed, for example, a Fujitsu Thermal Head (FTP-040 MCS001), a TDK Thermal Head F415 HH7-1089 or a Rohm Thermal Head KE 2OO8-F3. Alternatively, other known sources of energy for thermal dye transfer may be used, such as lasers as described in, for example, GB No. 2,083,726A.

A dye-receiving element by the present process can be used in a thermal dye transfer assemblage of the invention comprising a dye-donor element, and the dye-receiving element, wherein the dye-receiving element being in a superposed relationship with the dye-donor element so that the dye layer of the donor element is in contact with the dye image-receiving layer of the receiving element.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process repeated. The third color is obtained in the same manner.

Dye-donor elements that are used with the dye-receiving element made in accordance with process of the invention conventionally comprise a support having thereon a dye-containing layer. Any dye can be used in the dye-donor provided it is transferable to the dye-receiving layer by the action of heat. Especially good results have been obtained with sublimable dyes. Dye donors are described, e.g., in U.S. Pat. Nos. 4,916,112, 4,927,803 and 5,023,228, the disclosures of which are incorporated by reference.

As noted above, dye-donor elements are used to form a dye transfer image. Such a process comprises imagewise-heating a dye-donor element and transferring a dye image to a dye-receiving element as described above to form the dye transfer image.

A dye-donor element can be employed which comprises a poly(ethylene terephthalate) support coated with sequential repeating areas of cyan, magenta and yellow dye, and the dye transfer steps are sequentially performed for each color to obtain a three-color dye transfer image. Of course, when the process is only performed for a single color, then a monochrome dye transfer image is obtained.

Any dye can be used in the dye layer of the dye-donor element provided it is transferable to the dye-receiving layer by the action of heat. Especially good results have been obtained with sublimable dyes. Examples of sublimable dyes include anthraquinone dyes, e.g., Sumikaron Violet RS® (Sumitomo Chemical Co., Ltd.), Dianix Fast Violet 3R FS® (Mitsubishi Chemical Industries, Ltd.), and Kayalon Polyol Brilliant Blue N BGM® and KST Black 146® (Nippon Kayaku Co., Ltd.); azo dyes such as Kayalon Polyol Brilliant Blue BM®, Kayalon Polyol Dark Blue 2BM®, and KST Black KR® (Nippon Kayaku Co., Ltd.), Sumikaron Diazo Black 5G® (Sumitomo Chemical Co., Ltd.), and Miktazol Black 5GH® (Mitsui Toatsu Chemicals, Inc.); direct dyes such as Direct Dark Green B® (Mitsubishi Chemical Industries, Ltd.) and Direct Brown M® and Direct Fast Black D® (Nippon Kayaku Co. Ltd.); acid dyes such as Kayanol Milling Cyanine 5R® (Nippon Kayaku Co. Ltd.); basic dyes such as Sumiacryl Blue 6G® (Sumitomo Chemical Co., Ltd.), and Aizen Malachite Green® (Hodogaya Chemical Co., Ltd.);

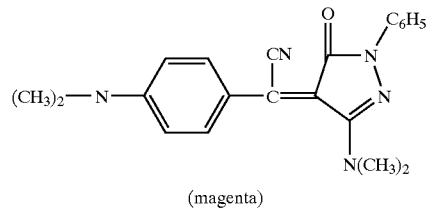

(magenta)

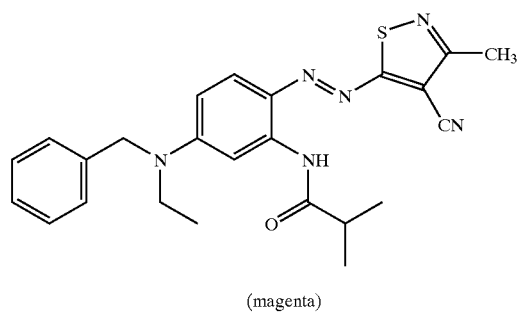

(magenta)

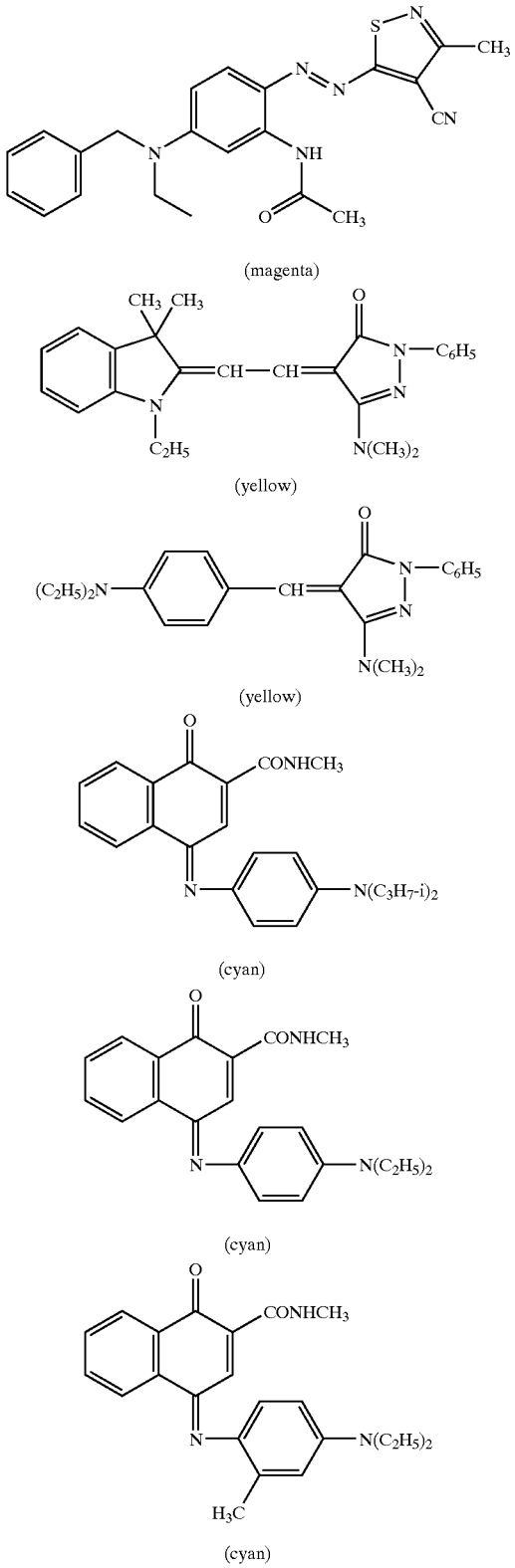

(magenta)

(yellow)

(yellow)

(cyan)

(cyan)

(cyan)

or any of the dyes disclosed in U.S. Pat. No. 4,541,830, the disclosure of which is hereby incorporated by reference. The above dyes may be employed singly or in combination to obtain a monochrome. The dyes may be used at a coverage of from about 0.05 to about 1 g/m² and are preferably hydrophobic.

A dye-barrier layer may be employed in the dye-donor elements to improve the density of the transferred dye. Such dye-barrier layer materials include hydrophilic materials such as those described and claimed in U.S. Pat. No. 4,716,144.

The dye layers and protection layer of the dye-donor element may be coated on the support or printed thereon by a printing technique such as a gravure process.

A slipping layer may be used on the back side of the dye-donor element to prevent the printing head from sticking to the dye-donor element. Such a slipping layer would comprise either a solid or liquid lubricating material or mixtures thereof, with or without a polymeric binder or a surface-active agent. Preferred lubricating materials include oils or semi-crystalline organic solids that melt below 100° C. such as poly(vinyl stearate), beeswax, perfluorinated alkyl ester polyethers, poly-caprolactone, silicone oil, poly(tetrafluoroethylene), carbowax, poly(ethylene glycols), or any of those materials disclosed in U.S. Pat. Nos. 4,717,711; 4,717,712; 4,737,485; and 4,738,950. Suitable polymeric binders for the slipping layer include poly(vinyl alcohol-co-butyral), poly(vinyl alcohol-co-acetal), polystyrene, poly(vinyl acetate), cellulose acetate butyrate, cellulose acetate propionate, cellulose acetate or ethyl cellulose.

The amount of the lubricating material to be used in the slipping layer depends largely on the type of lubricating material, but is generally in the range of about 0.001 to about 2 g/m². If a polymeric binder is employed, the lubricating material is present in the range of 0.05 to 50 weight %, preferably 0.5 to 40 weight %, of the polymeric binder employed.

Any material can be used as the support for the dye-donor element provided it is dimensionally stable and can withstand the heat of the thermal printing heads. Such materials include polyesters such as poly(ethylene terephthalate); polyamides; polycarbonates; glassine paper; condenser paper; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyimides such as polyimide amides and polyetherimides. The support generally has a thickness of from about 2 to about 30 µm.

The process of the present invention is also useful for making receiver sheets for electrostatographic imaging processes such as electrophotography. In a conventional electrostatographic copying process, a latent electrostatic image is formed on the insulating surface of a photoconductor element. If a dry development process is used, charged toner particles are applied to the electrostatic image, where they adhere in proportion to the electrostatic potential difference between the toner particles and the charges on the latent image. Toner particles that form the developed image are then transferred to a receiver sheet, where the transferred image is fixed, usually by a thermal fusion process in which the receiver sheet is passed between a pair of rollers under pressure and subjected to temperatures of about 200–300° F. (93–149° C.). It is conventional to transfer toner particles from the photoconductor element to the image receiver sheet by means of an electrostatic bias between the element and the receiver sheet.

During transfer, the toner particles adhere to or become partially embedded in the thermoplastic coating and are thereby more completely removed from the photoconductor element. A further improvement in toner transfer may be obtained by coating the thermoplastic polymer layer on the receiver sheet with a release agent. However, if the binder resin for the photoconductor and the thermoplastic polymer layer of the receiver sheet are appropriately selected with respect to their compositions and surface energies, a release agent is not necessary.

Receiver sheets for electrophotographic toner images most often comprise paper, although plastic sheets have also been used. U.S. Pat. No. 4,795,676, the disclosure of which is incorporated herein by reference, describes an electrostatic recording material composed of a multi-layered synthetic paper support having an electroconductive layer and a dielectric layer formed successively thereon. The support has a base layer, with paper-like layers of thermoplastic resin on both sides, and surface layers of thermoplastic resin containing little if any inorganic fine powder. Other patents describing alternative types of structures for electrophotographic receiver elements include, for example, U.S. Pat. No. 5,055,371 and U.S. Pat. No. 5,902,673, the disclosure of which are incorporated herein by reference. For example, the latter patent describes a toner image receiver sheet having a volume resistivity of from $1 \times 10^8$ Ohms per square to $1 \times 10^{13}$ Ohms per square, preferably about $1 \times 10^{10}$ ohms per square to $1 \times 10^{12}$ ohms per square. Volume resistivity within these ranges is desired to produce the electrostatic bias between the photoconductor element and the image receiver sheet required for efficient, complete transfer of the toner image particles to the sheet. The toner image receiver sheet cab comprise an opaque synthetic paper substrate and a thermoplastic organic polymeric image-receiving layer disposed thereon. In one embodiment, the receiver sheet has an image-receiving layer polymer having a glass transition temperature of about 40° C. to 60° C. and a thickness of about 1 micrometer to 30 micrometer, preferably a thickness of about 8 $\mu$m to 12 $\mu$m. The substrate suitably has a thickness of about 178 to 356 $\mu$m.

The following examples are provided to further illustrate the invention. The synthesis example is representative, and other polyesters may be prepared analogously or by other methods know in the art.

EXAMPLE 1

Polyester E-2 dried in a NOVATECH desiccant dryer at 43° C. for 24 hours. The dryer is equipped with a secondary heat exchanger so that the temperature will not exceed 43° C. during the time that the desiccant is recharged. The dew point is −40° C.

LEXAN 151 polycarbonate from GE and MB50-315 silicone from Dow Chemical Co. are mixed together in a 52:48 ratio and dried at 120° C. for 2–4 hours at −40° C. dew point.

Dioctyl Sebacate ('DOS) is preheated to 83° C., and phosphorous acid is mixed in to make a phosphorous acid concentration of 0.4%. This mixture is maintained at 83° C. and mixed for 1 hour under nitrogen before using.

These materials are then used in the compounding operation. The compounding is done on a LEISTRITZ ZSK 27 extruder with a 30:1 length to diameter ratio. The LEXAN-polycarbonate/MB50-315-silicone material is introduced into the compounder first, and melted. Then the dioctyl sebacate/phosphorous acid solution is added, and finally the polyester is added. The final formula is 70.07% polyester, 12.78% LEXAN 151 polycarbonate, 12% MB50-315 silicone, 5.13% DOS, and 0.02% phosphorous acid. A vacuum is applied with slightly negative pressure, and the melt temperature is 240° C. The melted mixture is then extruded through a strand die, cooled in 32° C. water and pelletized. The pelletized dye receiver is then aged for about 2 weeks.

The dye receiver pellets are then predried before extrusion, at 38° C. for 24 hours in a NOVATECH dryer described above. The dried material is then conveyed using desiccated air to the extruder.

The tie layer is also compounded. PELESTAT 300 antistat polymer from Sanyo Chemical Co. is predried in the above dryers at 77° C. for 24 hours. It is then melt mixed in the above compounder with undried HUNTSMAN P4G2Z-159 polypropylene homopolymer in a 70/30 ratio at about 240° C., then forced through a strand die into 20° C. water and pelletized. The compounded tie-layer pellets are then dried again at 77° C. for 24 hours in a NOVATECH dryer, and conveyed using desiccated air to the extruder.

The dye receiver pellets are then introduced into a liquid cooled hopper which feeds a 6.3 cm single screw BLACK CLAWSON extruder. This extruder has a 6.3 cm long cooling section in the beginning of the extruder, which is cooled by 20° C. water. The screw in this machine is a standard compression screw with a single mixer. The dye receiver pellets are melted in the extruder, and heated to a temperature of 238° C. The pressure is then increased through a melt pump, and the melted DRL composition is pumped to a CLEOREN coextrusion feedblock with AAABB configuration.

The tie-layer pellets are introduced into the liquid cooled hopper of another 6.3 com single screw extruder of the above configuration. The tie-layer pellets are also heated to a 238° C. temperature, and then pumped to the CLEOREN coextrusion feedblock.

The volumetric ratio of dye-receiving layer to tie layer is about 3:1. The dye-receiving layer and the tie layer are brought into intimate contact in the CLOEREN feedblock, then pass into a standard extrusion coating T die made by Cloeren. The die has a slot of 0.8 mm, and a land length of 2.5 mm. The die forms a melt curtain which travels 19 cm through the air before it is coated onto the laminate support. The laminate support comprises a paper core extrusion laminated with a 38 micron thick microvoided composite film (OPPalyte® 350TW, Mobile Chemical Co.) as disclosed in U.S. Pat. No. 5,244,861.

The melt curtain is immediately quenched in the nip between the chill roll and the laminate. The chill roll is operated at 21° C. At this point the thickness of the die receiving layer is 3 $\mu$m, and the thickness of the tie layer is 1 $\mu$m.

The resultant coated paper is then wound onto a roll, and then converted to the necessary dimensions for the thermal printing operation.

EXAMPLE 2

To illustrate the effect of branching in the polyester according to one aspect of the invention, two polyesters were made, one with no branching agent (C-1, having the structure described above) and 2% branching agent (E-2, having the structure described above). The percentage is base on the polyol-monomer component of the polyester. These polyesters were pelletized in preparation for coextrusion by feeding them into a 27 mm LEISTRITZ compounder with a 40:1 length to diameter ratio at 240° C. The pellets were then dried at 43° C. for 16 hours, and coextruded with a tie layer consisting of a 70/30 polyether/polypropylene mix. The mass ratio of polyester to tie layer is 3:1, and the melt temperature was 238° C. The two layers were coextruded through a 500 mm wide die with a die gap of 1 mm. The distance between the die exit and the nip between the chill roll and pressure roll was 140 mm. A web consisting of a polypropylene laminate, tie layer, and paper also passed through the nip and the extrudate was quenched with the tie layer in contact with the polypropylene side.

An experiment was performed comparing the extrusion characteristics of the branched and the unbranched polyester. The extruder rpms were set so that the thickness at 240 m/min would be 4 μm. The paper conveyance speed was gradually increased to determine the coating characteristics as a function of speed. As the speed with the unbranched coextrusion increased, draw resonance also increased. At speeds of about 210 m/min, the draw resonance was so severe that the melt curtain repeatedly broke, showing that this was an unrunnable condition. At 200 m/min, the draw resonance was 30%, where the draw resonance is defined as the (maximum width−minimum width)/maximum width.

Similarly, the same experiment was performed with the polyester that had 2% branching agent. This material conveyed easily at 240 m/min, with no draw resonance. This product was printed in a thermal printer with acceptable color production.

EXAMPLE 3

The following formulation for a dye-receiving layer according to the present invention was made:

70.07% polyester with 2% branching agent
12.78% LEXAN 151 bisphenol A polycarbonate
5.13% Dioctyl sebacate
12.0% MB50-315 silicone
0.02% phosphorous acid This material was melt compounded using conditions similar to those described above, but in a 50 mm compounder. The material was pelletized, then dried at 43° C. for 12 hours, and coextruded with a 3:1 ratio of tie layer, consisting of 70% PELESTAT 300 polyether and 30% polypropylene. The extrusion temperature was 238° C., the die gap was 0.75 mm, and the width was about 1270 mm. The distance between the die exit and the nip formed by the chill roll and the pressure roll is about 190 mm. This material was extruded onto the same substrate as described in example 2, and a line speed of 240 m/min was achieved with no draw resonance.

This material was printed in a thermal printer using the following dye donor and the color and quality were excellent.

Dye Donor:

A dye donor element of sequential areas of cyan, magenta and yellow dye was prepared by coating the following layers in order on a 6 μm poly(ethylene terephthalate) support:

(1) Subbing layer of TYZOR TBT (titanium tetra-n-butoxide) (DuPont Co.) (0.12 g/m$^2$) from a n-propyl acetate and 1-butanol solvent mixture.

(2) Dye-layer containing Cyan Dye 1 (0.42 g/m2) illustrated below, a mixture of Magenta Dye 1 (0.11 g/m2) and Magenta Dye 2 (0.12 g/m2) illustrated below, or Yellow Dye 1 illustrated below (0.20 g/m$^2$) and S-363N1 (a micronized blend of polyethylene, polypropylene and oxidized polyethylene particles) (Shamrock Technologies, Inc.) (0.02 g/m$^2$) in a cellulose acetate propionate binder (2.5% acetyl, 45% propionyl) (0.15–0.70 g/m$^2$) from a toluene, methanol, and cyclopentanone solvent mixture.

On the reverse side of the support was coated:

(1) Subbing layer of TYZOR TBT (0.12 g/m$^2$) from a n-propyl acetate and 1-butanol solvent mixture.

(2) Slipping layer of Emralon 329 (a dry film lubricant of poly(tetrafluoroethylene) particles in a cellulose nitrate resin binder) (Acheson Colloids Corp.) (0.54 g/m$^2$), p-toluene sulfonic acid (0.0001 g/m$^2$), BYK-320 (copolymer of a polyalkylene oxide and a methyl alkylsiloxane) (BYK Chemie, USA) (0.006 g/m$^2$), and Shamrock Technologies Inc. S-232 (micronized blend of polyethylene and camauba wax particles) (0.02 g/m2), coated from a n-propyl acetate, toluene, isopropyl alcohol and n-butyl alcohol solvent mixture.

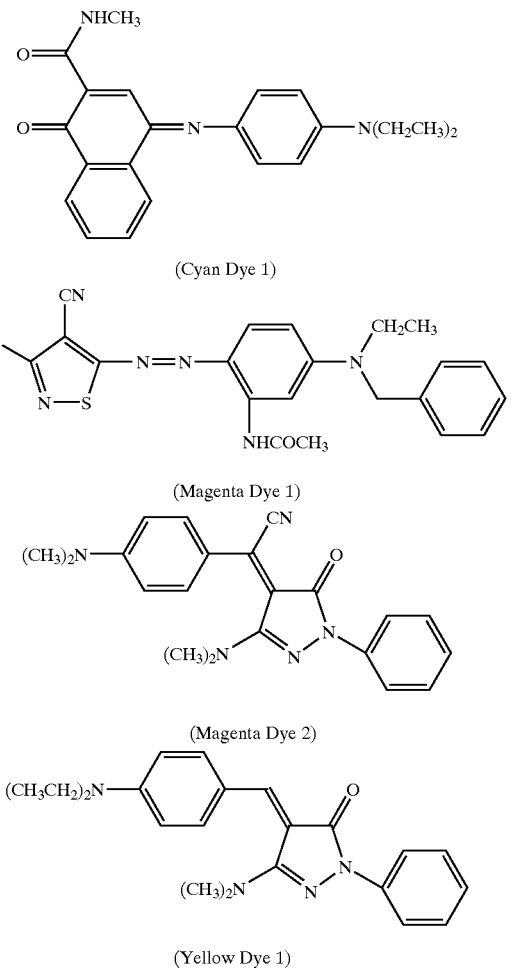

(Cyan Dye 1)

(Magenta Dye 1)

(Magenta Dye 2)

(Yellow Dye 1)

The dye side of the dye-donor element approximately 10 cm×13 cm in area was placed in contact with the polymeric receiving layer side of the dye-receiver element of the same area. The assemblage was fastened to the top of a motor-driven 56 mm diameter rubber roller and a TDK Thermal Head L-231, thermostated at 22° C., was pressed with a spring at a force of 36 Newtons (3.2 kg) against the dye-donor element side of the assemblage pushing it against the rubber roller.

The imaging electronics were activated and the assemblage was drawn between the printing head and roller at 7.0 mm/sec. Coincidentally, the resistive elements in the thermal print head were pulsed in a determined pattern for 29 μsec/pulse at 129 μsec intervals during the 33 msec/dot printing time to create an image. When desired, a stepped density image was generated by incrementally increasing the number of pulses/dot from 0 to 255. The voltage supplied to the print head was approximately 24.5 volts, resulting in an instantaneous peak power of 1.27 watts/dot and a maximum total energy of 9.39 mJoules/dot.

Individual cyan, magenta and yellow images were obtained by printing from three dye-donor patches. When properly registered a full color image was formed. The Status A red, green, and blue reflection density of the stepped density image at maximum density, Dmax, were read and recorded.

The invention has been described in detail with particular reference to preferred embodiments thereof, but it will be understood that variations and modifications can be effected within the spirit and scope of the invention.

What is claimed is:

1. A process of forming a multilayer film comprising at least two layers, a surface layer and a tie layer directly adjacent the surface layer, wherein the process comprises:
    (a) forming a first melt, for the surface layer, comprising a first polymeric binder;
    (b) forming a second melt, for the tie layer, comprising a thermoplastic antistat polymer, wherein the second melt exhibits a viscosity that is not more than 10 times or less than 1/10 that of the first melt during the following extrusion step;
    (c) coextruding the two melts to form a composite film;
    (d) stretching the composite film to reduce its thickness; and
    (e) applying the stretched composite film to a support while simultaneously reducing the temperature of the composite film below the Tg of the surface layer.

2. The process of claim 1 wherein the antistat polymer exhibits a surface resistivity of $10^5$ to $10^{13}$ Ohms per square.

3. The process of claim 1 wherein antistat polymer is selected from the group consisting of polyether-block copolyamides, polyetheresteramides, segmented polyether urethanes, and polyether-block-polyolefins.

4. The process of claim 1 wherein the composition of the tie layer exhibits a viscosity in the range of is 100 to 10,000 poise at 1 $sec^{-1}$ shear rate at a temperature between 100 and 300° C.

5. The process of claim 1 wherein the antistat polymer is a block polymer which has a structure in which blocks of a polyolefin and blocks of a hydrophilic polymer are bonded together alternately and repeatedly.

6. The process of claim 5 wherein the blocks of the hydrophilic polymer are polyether blocks.

7. The process of claim 6 wherein the polyether blocks are formed from one or more alkylene oxides having 2 to 4 carbon atoms.

8. The process of claim 7 wherein the polyether blocks comprise ethylene oxide, propylene oxide, butylene oxide, or combinations thereof.

9. The process of claim 5 wherein the polyolefins is obtained by polymerization of one or a mixture of two or more olefins, containing 2 to 12 carbon atoms.

10. The process of claim 5 wherein the polyolefin of the block polymer comprises carbonyl groups at both polymer termini and/or a carbonyl group at one polymer terminus.

11. The process of claim 1 wherein the antistat polymer comprises a block copolymer formed by the reaction of a mixture comprising a modified polyether and a modified polyolefin.

12. The process of claim 1 wherein the anti stat polymer comprises a block copolymer of polyethylene oxide polyether segments with polypropylene and/or polyethylene polyolefin segments.

13. The process of claim 12 wherein a compatibilizer is substantially absent from the tie layer.

14. The process of claim 12 wherein the block copolymer has a number average molecular weight of 2,000 to 60,000 as determined by gel permeation chromatography.

15. The process of claim 1 wherein the tie layer comprises an antistat polymer in combination with a compatibilizer.

16. The process of claim 15 wherein the antistat tie layer is a copolymer of polyether and polyamide.

17. The process of claim 1 wherein the thickness of the surface layer is between 1 and 5 micrometers.

18. The process of claim 1 wherein the support is a multilayer sheet or web.

19. The process of claim 18 wherein the support comprises a compliant substrate sheet over a base support comprising a polyolefin-containing surface layer.

20. The process of claim 19 wherein a surface of the support is a polyolefin-containing film.

21. The process of claim 19 wherein the support further comprises a backing layer on the base support.

22. The process of claim 19 wherein the surface layer is an imaging layer for receiving an electrophotographic toner.

23. The process of claim 1, wherein the surface layer is an image-receiving layer for receiving an image by thermal dye transfer.

24. The process of claim 1, wherein the surface layer is a dye-receiving layer, a pigment-receiving layer, or a toner-receiving layer.

25. A process of making an image recording element comprising a support having thereon an image-receiving layer and, between the support and the image-receiving layer, a tie layer, wherein the process comprises:
    (a) forming a first melt, for the image-receiving layer, comprising a first polymeric binder;
    (b) forming a second melt, for the tie layer, comprising a thermoplastic antistat polymer, wherein the second melt exhibits a viscosity that is not more than 10 times or less than 1/10 that of the first melt when coextruded with the first melt;
    (c) coextruding the two melts to form a composite film;
    (d) stretching the composite film to reduce the thickness; and
    (e) applying the stretched composite film to a support for the image recording element while simultaneously reducing the temperature below the Tg of the image-receiving layer.

26. The process of claim 25 wherein a surface of the support in contact with the tie layer comprises a polyolefin.

27. The process of claim 25 wherein the support is a moving web and the film extruded over the moving web.

28. The process of claim 25 wherein the image-receiving layer comprises a polyester binder.

29. The process of claim 28 wherein the polyester comprises recurring dibasic acid derived units and polyol derived units, at least 50 mole % of the dibasic acid derived units comprising dicarboxylic acid derived units containing an alicyclic ring within two carbon atoms of each carboxyl group of the corresponding dicarboxylic acid, and at least 30 mole % of the polyol derived units containing an aromatic ring not immediately adjacent to each hydroxyl group of the corresponding polyol, 25 to 75 mole % of the polyol derived units of the polyester are non-aromatic and comprise 2 to 10 carbon atoms, and at least 0.1 mole percent, in sum total, of (a) units, if any, derived from a multifunctional polyol having more than two hydroxy groups, based on the total polyol component in the polymer and (b) units, if any, derived from a polyacid having more than two carboxylic acid groups, including derivatives thereof, based on the total acid derived units.

30. The process of claim 28 wherein the average weight molecular weight of the polyester is at least 50,000.

31. The process of claim 28 wherein the average weight molecular weight of the polyester is 100,000 to 1,000,000.

32. The process of claim 28 wherein the polyester has a glass transition temperature greater than about 40° C.

33. The process of claim 28 wherein the polyester has a glass transition temperature between 40° C. and 100° C.

34. The process of claim 28 wherein the polyester is blended with a second polymer that is not a polyester.

35. The process of claim 34 wherein the second polymer is a polycarbonate.

36. The process of claim 35 wherein the polycarbonate is a bisphenol-A polycarbonate and the polycarbonate and polyester polymers are blended at a weight ratio of from 90:10 to 10:90.

37. The process of claim 25 wherein the image recording element is an electrophotographic recording element and the image-receiving layer is a toner-receiving layer.

38. The process of claim 25 wherein the image recording element is a dye-receiver element for thermal dye transfer and the image-receiving layer is a dye-receiving layer.

39. The process of claim 25, further comprising an effective amount of a release agent in the first melt.

40. The process of claim 25 wherein the image-receiving layer is a dye-receiving layer, a pigment-receiving layer, and/or toner-receiving layer.

41. The process of claim 25 wherein the image-receiving layer is 1 to 50 micrometers thick.

42. A process of forming a dye transfer image comprising:

making an image recording element comprising a support having thereon an image-receiving layer and, between the support and the image-receiving layer, a tie layer, by forming a first melt, for the image-receiving layer, comprising a first polymeric binder; forming a second melt, for the tie layer, comprising a thermoplastic antistat polymer, wherein the second melt exhibits a viscosity that is not more than 10 times or less than $\frac{1}{10}$ that of the first melt when coextruded with the first melt; coextruding the two melts to form a composite film; stretching the composite film to reduce the thickness; and applying the stretched composite film to the support for the image recording element while simultaneously reducing the temperature below the Tg of the image-receiving layer;

imagewise-heating a dye-donor element comprising a support having thereon a dye layer and transferring a dye image from the dye layer to the image recording element to form said dye transfer image.

* * * * *

UNITED STATES PATENT AND TRADEMARK OFFICE
CERTIFICATE OF CORRECTION

PATENT NO. : 6,897,183 B2
DATED : May 24, 2005
INVENTOR(S) : Eric E. Arrington et al.

It is certified that error appears in the above-identified patent and that said Letters Patent is hereby corrected as shown below:

Column 37,
Line 34, delete "range of is 100" and replace with -- range of 100 --.
Line 49, delete "polyolefins" and replace with -- polyolefin --.
Line 50, after "polymerization of one" insert -- olefin --.

Column 38,
Line 39, delete "composite film to a support" and replace with -- composite film to the support --.
Line 46, after "and the film" insert -- is --.

Column 39,
Line 25, delete "and/or" and replace with -- or a --.

Signed and Sealed this

Fifteenth Day of November, 2005

JON W. DUDAS
*Director of the United States Patent and Trademark Office*